United States Patent
Mitsui

(10) Patent No.: US 11,175,540 B2
(45) Date of Patent: Nov. 16, 2021

(54) LIQUID CRYSTAL DEVICE MANUFACTURING METHOD AND LIQUID CRYSTAL DEVICE

(71) Applicant: JVCKENWOOD Corporation, Yokohama (JP)

(72) Inventor: Naoki Mitsui, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 0 days.

(21) Appl. No.: 16/781,257

(22) Filed: Feb. 4, 2020

(65) Prior Publication Data

US 2020/0257147 A1    Aug. 13, 2020

(30) Foreign Application Priority Data

Feb. 7, 2019 (JP) ............................. JP2019-020711

(51) Int. Cl.
*G02F 1/1339* (2006.01)
*G02F 1/1341* (2006.01)
*G02F 1/1333* (2006.01)

(52) U.S. Cl.
CPC .......... *G02F 1/1339* (2013.01); *G02F 1/1341* (2013.01); *G02F 1/133302* (2021.01); *G02F 1/133311* (2021.01)

(58) Field of Classification Search
CPC ................. G02F 1/1339; G02F 1/1341; G02F 2001/133302; G02F 2001/133311
See application file for complete search history.

(56) References Cited

U.S. PATENT DOCUMENTS

| 2009/0194572 A1* | 8/2009 | Miyashita | G02F 1/133351 225/2 |
| 2015/0228526 A1* | 8/2015 | Saeki | C09J 7/401 438/464 |
| 2016/0070127 A1* | 3/2016 | Ishikawa | G02F 1/1368 349/42 |
| 2018/0188594 A1* | 7/2018 | Kanehiro | G02F 1/134309 |

FOREIGN PATENT DOCUMENTS

JP    2006-267413 A    10/2006

\* cited by examiner

*Primary Examiner* — Nathanael R Briggs
(74) *Attorney, Agent, or Firm* — Nath, Goldberg & Meyer; Jerald L. Meyer

(57) ABSTRACT

Provided is a liquid crystal device manufacturing method capable of accurately cleaving a substrate when it is cleaved from grooves formed therein by reducing the variation in depth of the grooves. A structure is fabricated. Drive substrates having terminal portions are formed by dividing a first substrate. A protection film is attached to a second substrate side of the structure. Grooves are formed in the second substrate near the terminal portions through the protection film. Counter substrates are formed by cleaving the second substrate from the grooves, the end surface of each counter substrate on the terminal portion side including a cleaved surface. Liquid crystal devices are fabricated in each of which a drive substrate and a counter substrate are bonded to each other by a seal, and a liquid crystal is filled in a gap between the drive substrate and the counter substrate and sealed by the seal.

3 Claims, 26 Drawing Sheets

LIQUID CRYSTAL DEVICE MANUFACTURING METHOD AND LIQUID CRYSTAL DEVICE

CROSS REFERENCE TO RELATED APPLICATION

This application is based upon and claims the benefit of priority under 35U.S.C. § 119 from Japanese Patent Application No. 2019-020711 filed on Feb. 7, 2019, the entire contents of which are incorporated herein by reference.

BACKGROUND

The present invention relates to a liquid crystal device manufacturing method and a liquid crystal device.

Liquid crystal devices are used in display apparatuses such as projectors and head-up displays. Such a liquid crystal device generates image light by performing light modulation of applied illumination light on a pixel-by-pixel basis. The display apparatus projects the image light generated by the liquid crystal device onto a screen or the like to thereby display an image.

The liquid crystal device has a drive substrate, a counter substrate, a liquid crystal, and a seal. The drive substrate is for example a semiconductor substrate, and the counter substrate is for example a glass substrate. The liquid crystal is filled in a gap between the drive substrate and the counter substrate. The seal fixes the drive substrate and the counter substrate to each other and seals the liquid crystal. Japanese Patent Application Publication No. 2006-267413 discloses an example of such a liquid crystal device.

A plurality of liquid crystal devices can be fabricated by cutting a semiconductor substrate with for example a dicing blade, forming grooves in a glass substrate with for example a scribing wheel, and cleaving the glass substrate from these grooves.

The glass substrate can be divided by raising the pressure of the scribing wheel to the glass substrate. The depth of the grooves to be formed in the glass substrate can be changed by lowering the pressure of the scribing wheel to the glass substrate.

However, lowering the pressure of the scribing wheel results in a large variation in the depth of the grooves. The large variation in the depth of the grooves makes it difficult to accurately cleave the substrate, such as the glass substrate, when the substrate is cleaved from the grooves.

SUMMARY

A first aspect of one or more embodiments provides a liquid crystal device manufacturing method including: fabricating a structure in which a first substrate having a terminal portion and a second substrate are bonded to each other by a seal with a gap between the first substrate and the second substrate, and a liquid crystal is filled in the gap and sealed by the seal; forming a drive substrate having the terminal portion by dividing the first substrate; attaching a protection film to the second substrate side of the structure; forming a groove in the second substrate near the terminal portion through the protection film; forming a counter substrate by cleaving the second substrate from the groove, an end surface of the counter substrate on the terminal portion side including a cleaved surface; and fabricating a liquid crystal device in which the drive substrate and the counter substrate are bonded to each other by the seal with the gap between the drive substrate and the counter substrate, and the liquid crystal is filled in the gap and sealed by the seal.

A Second aspect of one or more embodiments provides a liquid crystal device including: a drive substrate having a terminal portion; a counter substrate whose end surface on the terminal portion side includes a cleaved surface; a seal bonding the drive substrate and the counter substrate to each other with a gap therebetween; and a liquid crystal filled in the gap and sealed by the seal.

DETAILED DESCRIPTION

First Embodiment

Figure 1A:
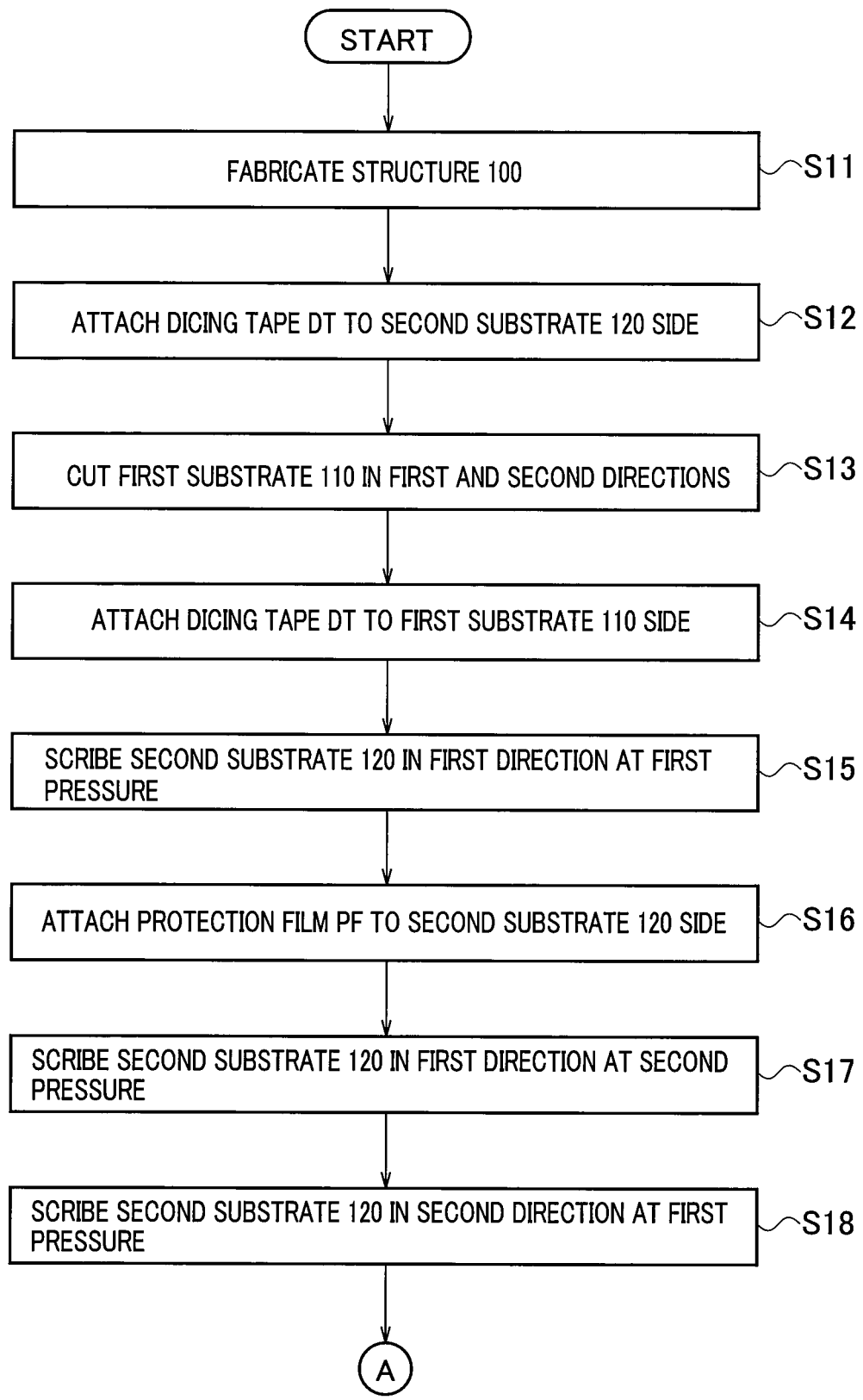
FIG. 1A is a flowchart illustrating an example of a liquid crystal device manufacturing method in a first embodiment.
Figure 2:
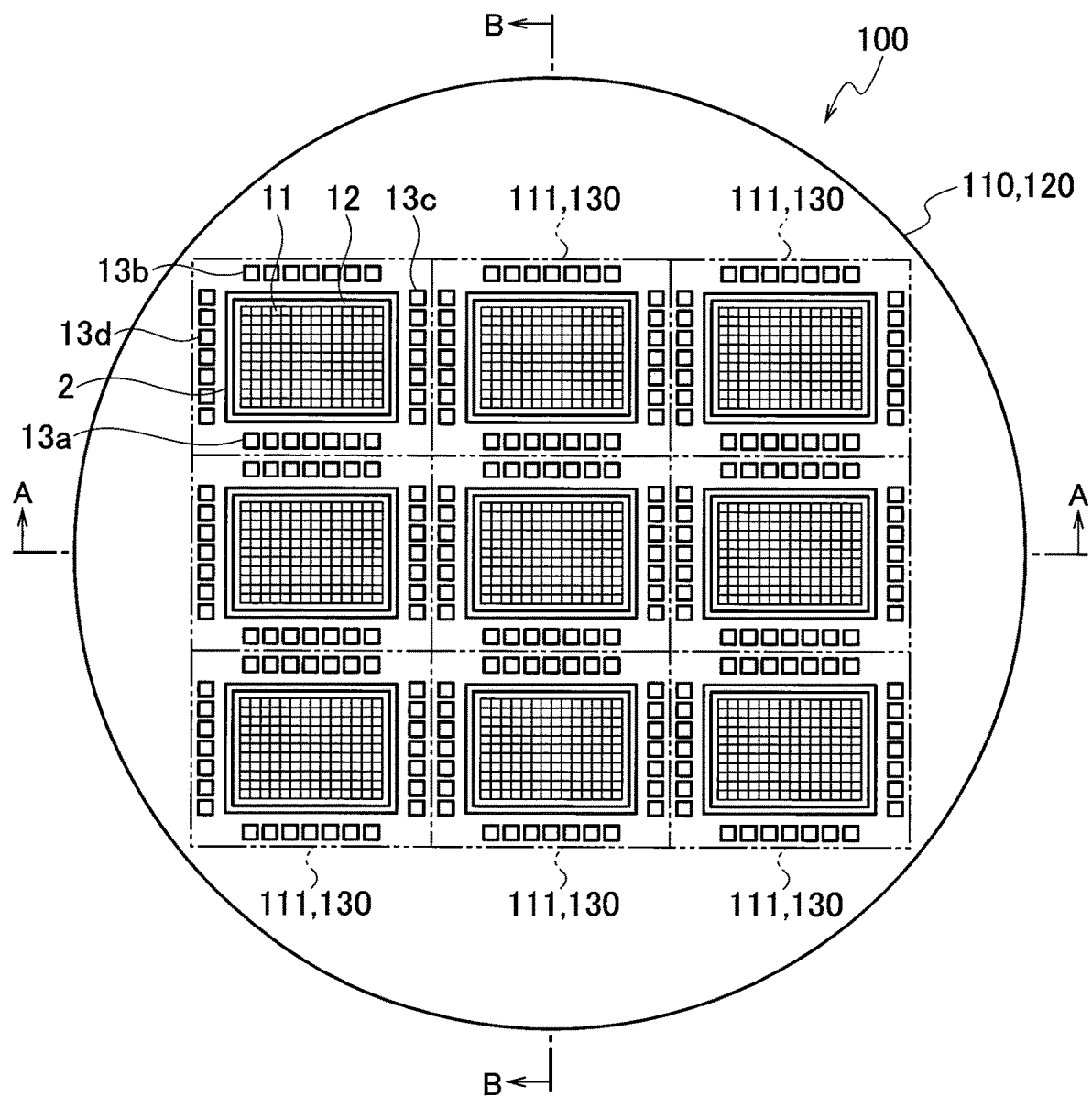
FIG. 2 is a plan view illustrating an example of a structure.
Figure 3:
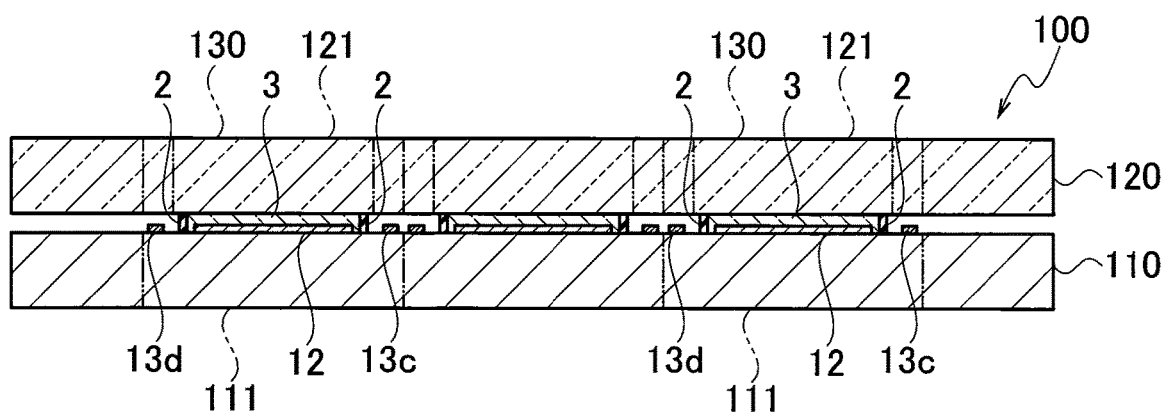
FIG. 3 is a cross-sectional view illustrating the structure taken along line A-A in FIG. 2.
Figure 4:
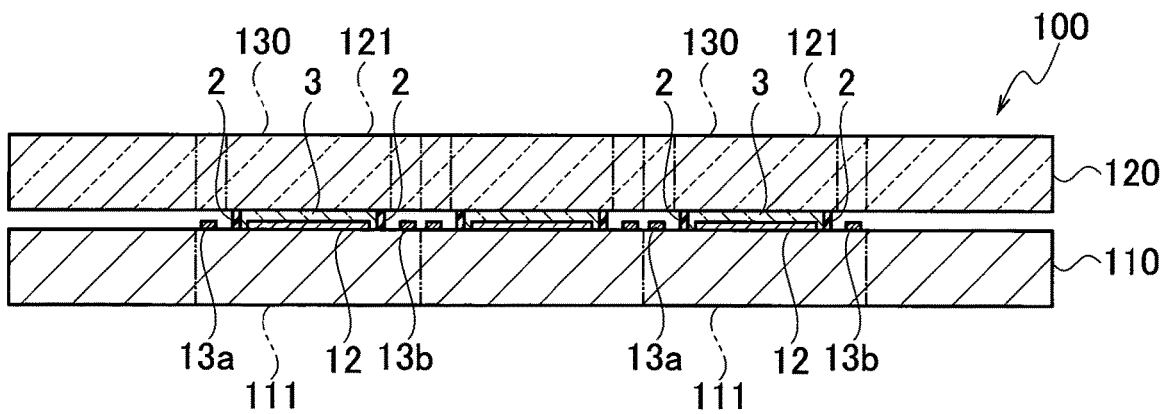
FIG. 4 is a cross-sectional view illustrating the structure taken along line B-B in FIG. 2.

An example of a liquid crystal device manufacturing method and a liquid crystal device in a first embodiment will be described with reference to the flowcharts illustrated in FIGS. 1A and 1B and FIGS. 2 to 23. Referring to FIG. 1A, a bonding apparatus fabricates a structure 100 in step S11. FIG. 2 illustrates a state where nine liquid crystal devices 130 are disposed in one structure 100. FIG. 3 schematically illustrates the structure 100 taken along line A-A in FIG. 2. FIG. 4 schematically illustrates the structure 100 taken along line B-B in FIG. 2. The number of liquid crystal devices 130 fabricated from a single structure 100 and their arrangement can be set at any number and arrangement.

As illustrated in FIGS. 2 to 4, the structure 100 has a construction in which a first substrate 110 that will be drive substrates 111 and a second substrate 120 that will be counter substrates 121 are bonded to each other by seals 2 with a gap between the first substrate 110 and the second substrate 120, and a liquid crystal 3 is filled in the gap between the first substrate 110 and the second substrate 120 and sealed by the seals 2. FIG. 2 schematically illustrates the structure 100 as viewed from the second substrate 120. The structure 100 can be fabricated by a publicly known manufacturing method. A semiconductor substrate may be used as the first substrate 110, and a glass substrate may be used as the second substrate 120.

The up-down direction and the left-right direction in FIG. 2 will be referred to as a first direction and a second direction, respectively. The first direction and the second direction are perpendicular to each other.

The drive substrates 111 and the counter substrates 121 have a rectangular planar shape. Each drive substrate 111 has a pixel region 12 in which a plurality of pixel electrodes 11 are formed, and a plurality of terminal portions 13a to 13d. On the first substrate 110, a plurality of sets each including a pixel region 12 and terminal portions 13a to 13d are disposed in a matrix. A single set including a pixel region 12 and terminal portions 13a to 13d forms a single liquid crystal device 130. In other words, a plurality of liquid crystal devices 130 are disposed in a matrix in the structure 100. The first direction corresponds to the short-edge direction of each liquid crystal device 130 (drive substrate 111 and counter substrate 121), and the second direction corresponds to the long-edge direction of the liquid crystal device 130.

The terminal portions 13a (first terminal portions) are formed on one of the long-edge sides of the drive substrate 111, and the terminal portions 13b (second terminal portions) are formed on the other long-edge side of the drive substrate 111. The terminal portions 13c (third terminal portions) are formed on one of the short-edge sides of the drive substrate 111, and the terminal portions 13d (fourth terminal portions) are formed on the other short-edge side of the drive substrate 111.

Figure 5:
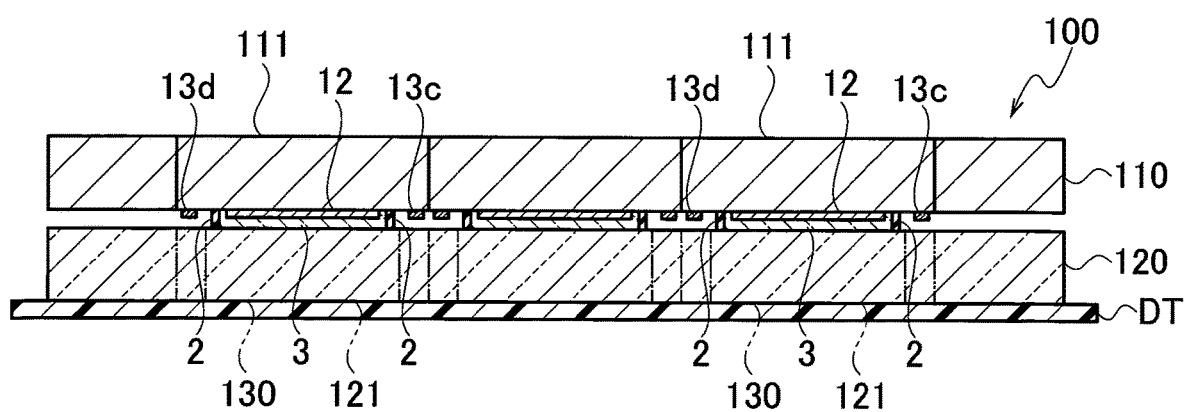
FIG. 5 is a cross-sectional view illustrating the structure in steps of the liquid crystal device manufacturing method in the first embodiment.
Figure 6:
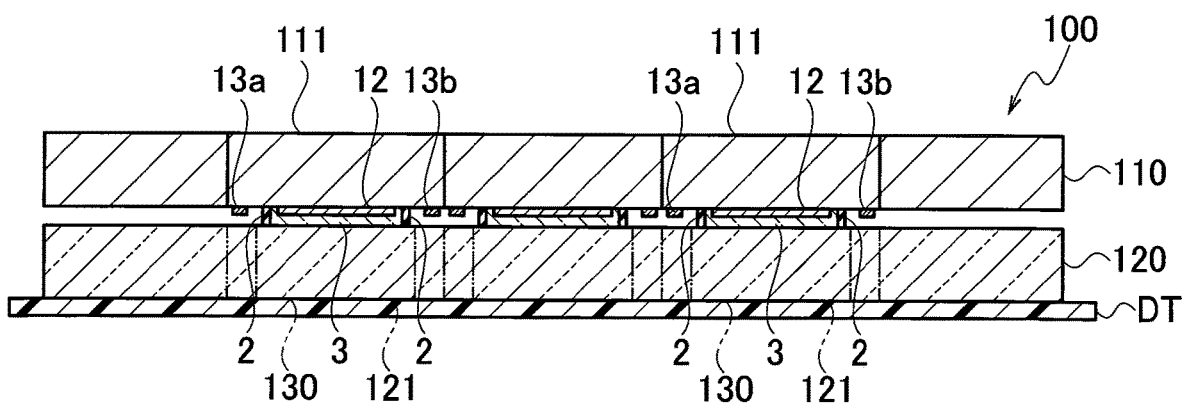
FIG. 6 is a cross-sectional view illustrating the structure in the steps of the liquid crystal device manufacturing method in the first embodiment.

As illustrated in FIGS. 5 and 6, in step S12, an attachment apparatus attaches dicing tape DT to the second substrate 120 side of the structure 100. FIG. 5 corresponds to FIG. 3 and illustrates the structure 100 turned upside down. FIG. 6 corresponds to FIG. 4 and illustrates the structure 100 turned upside down. In step S13, a dicing apparatus cuts the first substrate 110 with a dicing blade in the first and second directions at a pitch corresponding to that of the liquid crystal devices 130. As a result, the first substrate 110 is divided for each individual liquid crystal device 130, so that a plurality of drive substrates 111 are formed. The operator then removes the dicing tape DT from the structure 100.

Figure 7:
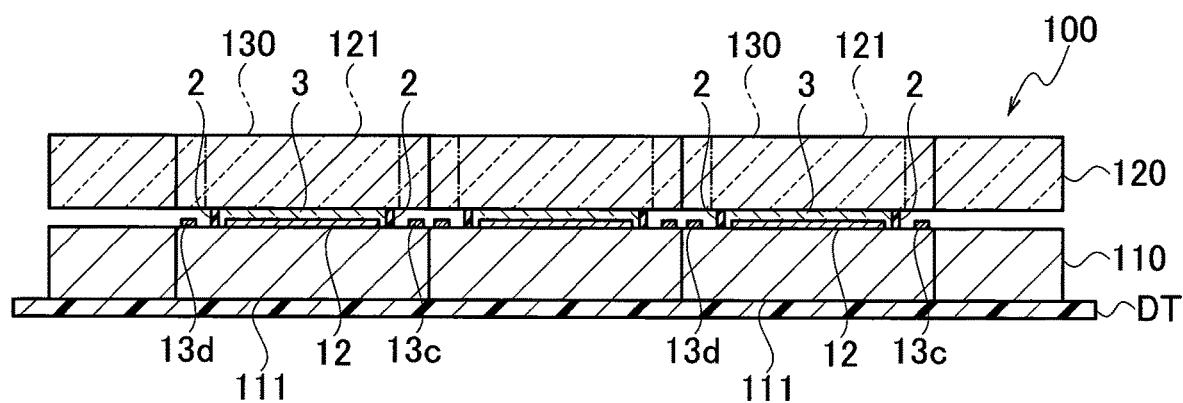
FIG. 7 is a cross-sectional view illustrating the structure in steps of the liquid crystal device manufacturing method in the first embodiment.
Figure 8:
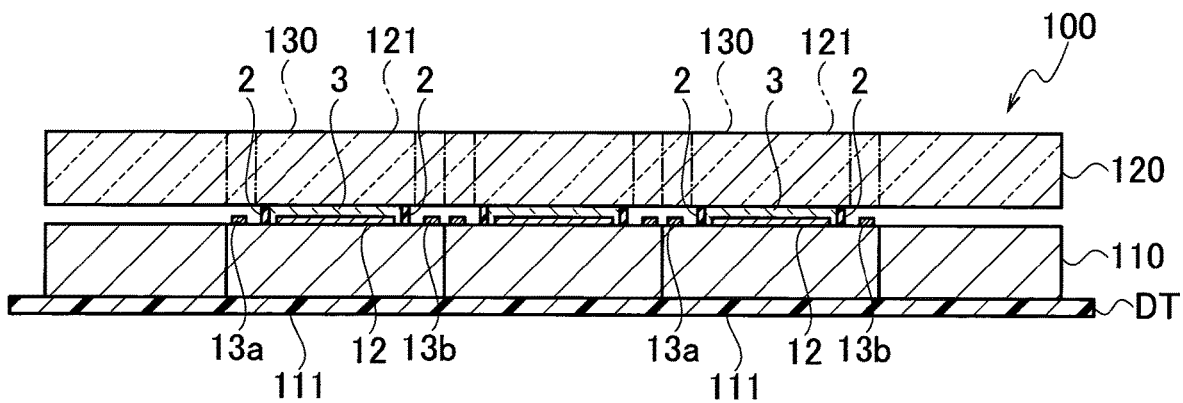
FIG. 8 is a cross-sectional view illustrating the structure in the steps of the liquid crystal device manufacturing method in the first embodiment.

As illustrated in FIGS. 7 and 8, in step S14, the attachment apparatus attaches dicing tape DT to the first substrate 110 side of the structure 100. FIG. 7 corresponds to FIG. 5 and illustrates the structure 100 turned upside down. FIG. 8 corresponds to FIG. 6 and illustrates the structure 100 turned upside down. In step S15, a scribing apparatus scribes the second substrate 120 with a scribing wheel in the first direction at a first pressure at a pitch corresponding to that of the liquid crystal devices 130. The first pressure is a relatively high pressure at which the second substrate 120 can be divided via scribing.

Figure 9:
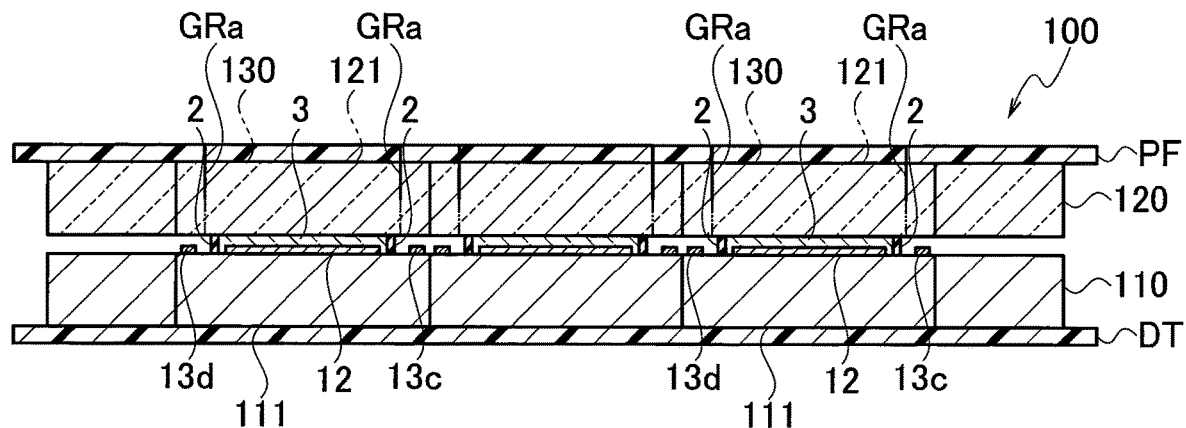
FIG. 9 is a cross-sectional view illustrating the structure in steps of the liquid crystal device manufacturing method in the first embodiment.
Figure 10:
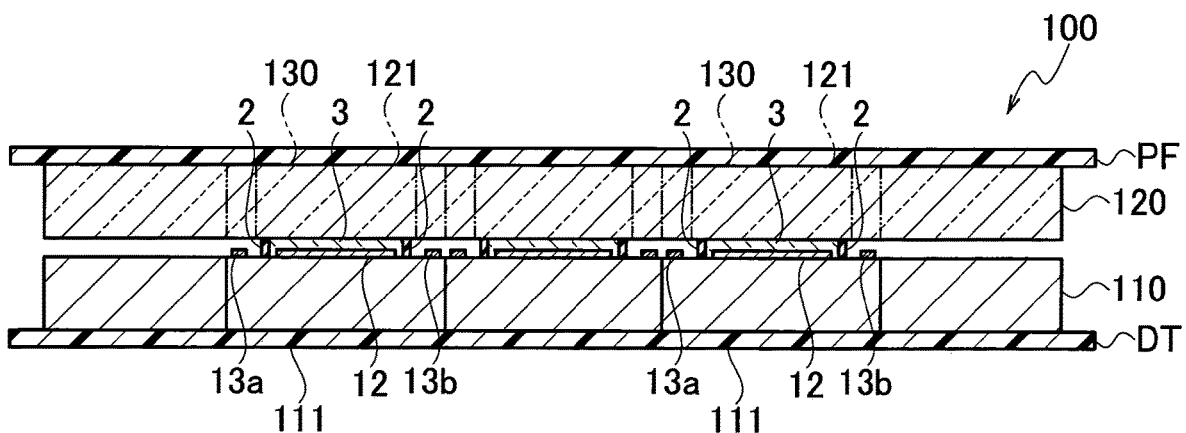
FIG. 10 is a cross-sectional view illustrating the structure in the steps of the liquid crystal device manufacturing method in the first embodiment.

As illustrated in FIGS. 9 and 10, in step S16, the attachment apparatus attaches an adhesive protection film PF to the second substrate 120 side of the structure 100. FIG. 9 corresponds to FIG. 7, and FIG. 10 corresponds to FIG. 8. In step S17, the scribing apparatus moves the scribing wheel to a position corresponding to a short edge of a counter substrate 121, and scribes the second substrate 120 in the first direction at a second pressure. The second pressure is a relatively low pressure which is lower than the first pressure and at which the second substrate 120 can be scribed to such a depth as not to divide the second substrate 120 (e.g., a depth in the range of ½ to ⅓ of the thickness of the second substrate 120).

Generally, scribing the second substrate 120 at a low pressure results in a large variation in the depth of the groove formed in the second substrate 120. The large variation in the depth of the groove makes it difficult to accurately cleave and divide the second substrate 120 when the second substrate 120 is cleaved from the groove.

In step S17, the second substrate 120 is scribed through the protection film PR The protection film PF absorbs the variation in the pressure of the scribing wheel applied to the second substrate 120. An adhesive resin film may be used as the protection film PR The protection film PF only needs to be of a material and a thickness that can absorb the variation in the pressure of the scribing wheel applied to the second substrate 120.

Thus, by scribing the second substrate 120 through the protection film PF, the second substrate 120 can be scribed at the second pressure, which is higher than a third pressure of the scribing wheel that, without the protection film PF, would be applied to scribe the second substrate 120, with a reduction in the variation in the pressure of the scribing wheel applied to the second substrate 120. As a result, as illustrated in FIG. 9, a plurality of grooves GRa with only a small variation in depth are formed in the second substrate 120. The grooves GRa are formed at positions corresponding to the short edges of the counter substrates 121 in the second substrate 120.

The scribing wheel digs into the protection film PF and scribes the second substrate 120. The protection film PF suppresses displacement of the scribing wheel and therefore makes the positional accuracy of the grooves GRa better than that in the case where the protection film PF is not attached to the second substrate 120.

Figure 11:
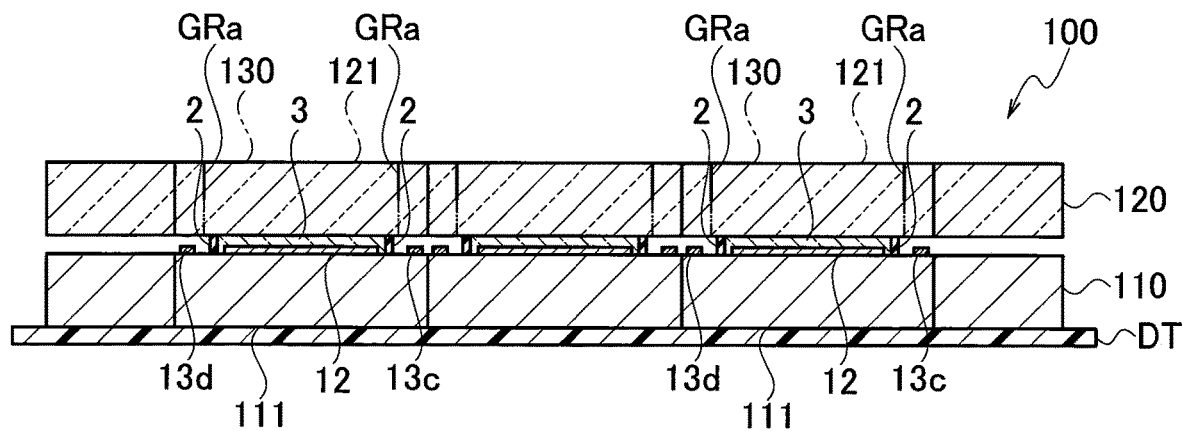
FIG. 11 is a cross-sectional view illustrating the structure in steps of the liquid crystal device manufacturing method in the first embodiment.
Figure 12:
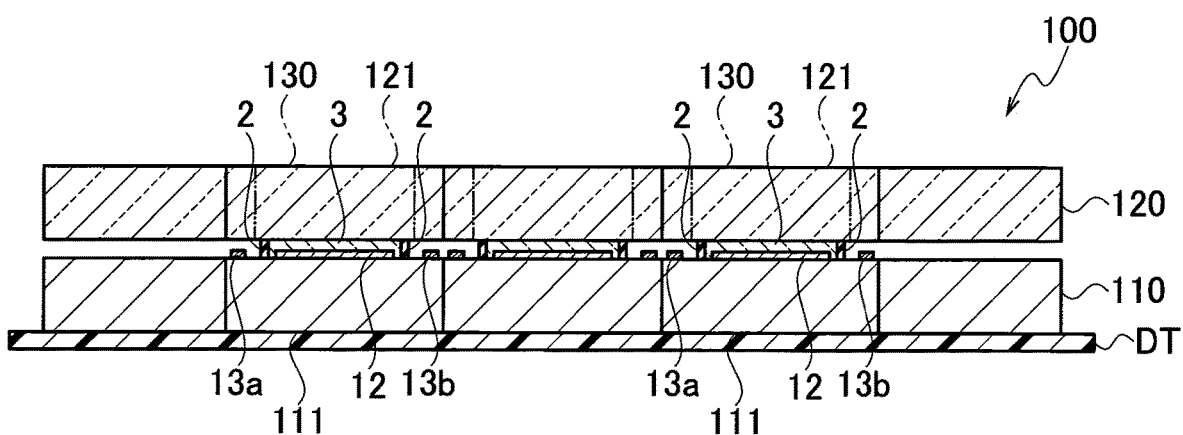
FIG. 12 is a cross-sectional view illustrating the structure in the steps of the liquid crystal device manufacturing method in the first embodiment.

As illustrated in FIGS. 11 and 12, the operator removes the protection film PF from the structure 100. FIG. 11 corresponds to FIG. 9, and FIG. 12 corresponds to FIG. 10. In step S18, the scribing apparatus scribes the second substrate 120 with the scribing wheel in the second direction at the first pressure at a pitch corresponding to that of the liquid crystal devices 130.

Figure 1B:
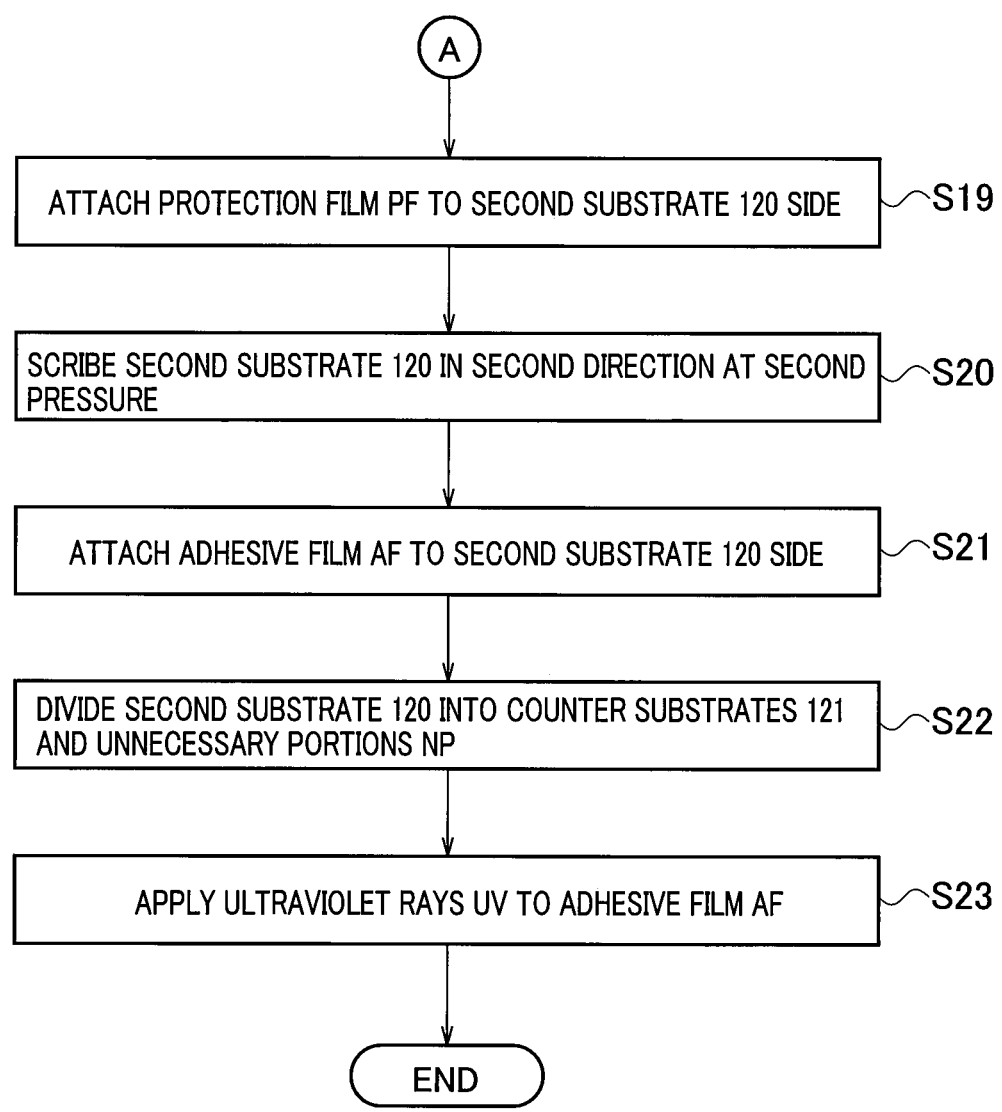
FIG. 1B is a flowchart illustrating the example of the liquid crystal device manufacturing method in the first embodiment.
Figure 13:
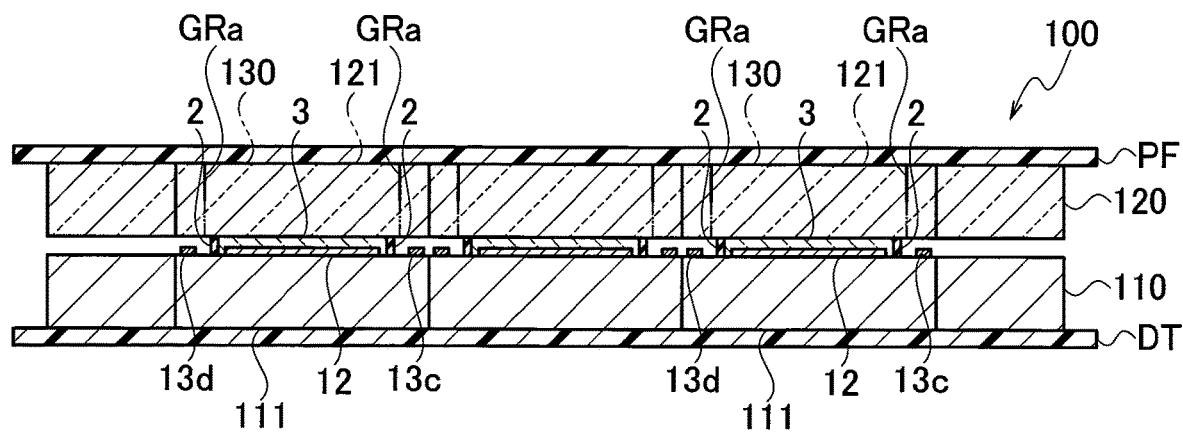
FIG. 13 is a cross-sectional view illustrating the structure in steps of the liquid crystal device manufacturing method in the first embodiment.
Figure 14:
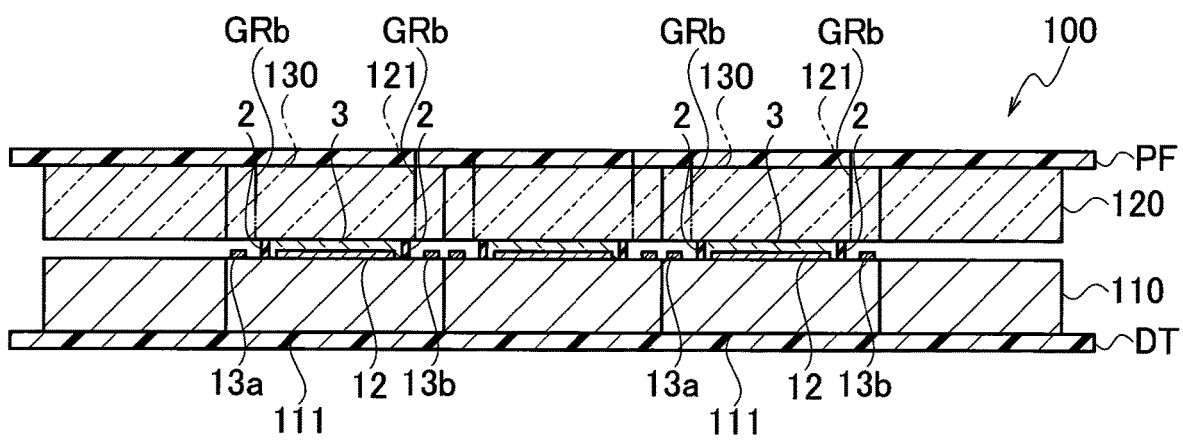
FIG. 14 is a cross-sectional view illustrating the structure in the steps of the liquid crystal device manufacturing method in the first embodiment.

Referring to FIG. 1B, in step S19, the attachment apparatus attaches a protection film PF to the second substrate 120 side of the structure 100, as illustrated in FIGS. 13 and 14. FIG. 13 corresponds to FIG. 11, and FIG. 14 corresponds to FIG. 12.

In step S20, the scribing apparatus moves the scribing wheel to a position corresponding to a long edge of a counter substrate 121, and scribes the second substrate 120 in the second direction at the second pressure. As a result, as illustrated in FIG. 14, a plurality of grooves GRb with only a small variation in depth are formed in the second substrate 120. The grooves GRb are formed at positions corresponding to the long edges of the counter substrates 121 in the second substrate 120.

The scribing wheel digs into the protection film PF and scribes the second substrate 120. The protection film PF suppresses displacement of the scribing wheel and therefore makes the positional accuracy of the grooves GRb better than that in the case where the protection film PF is not attached to the second substrate 120.

Figure 15:
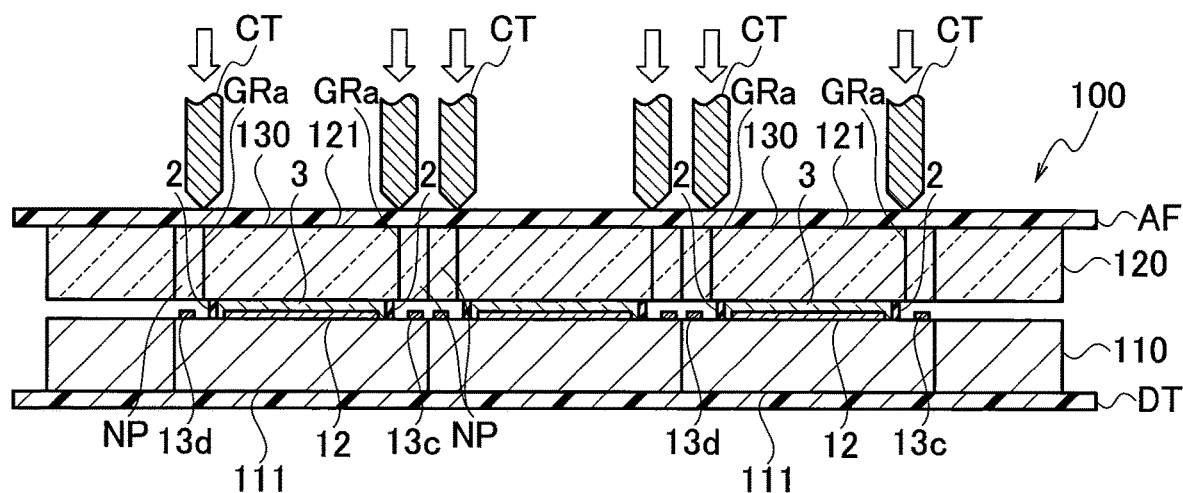
FIG. 15 is a cross-sectional view illustrating the structure in steps of the liquid crystal device manufacturing method in the first embodiment.
Figure 16:
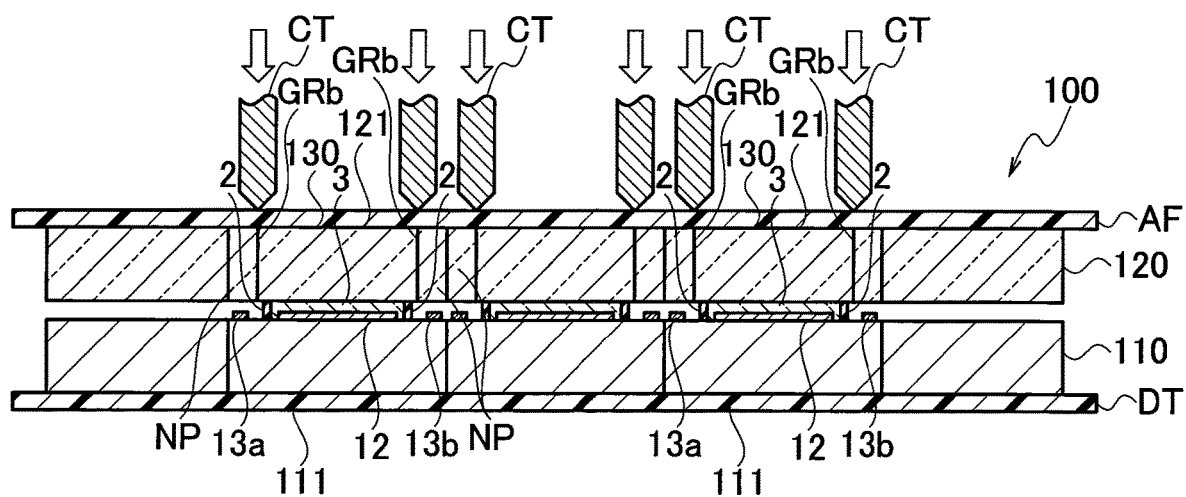
FIG. 16 is a cross-sectional view illustrating the structure in the steps of the liquid crystal device manufacturing method in the first embodiment.

As illustrated in FIGS. 15 and 16, the operator removes the protection film PF from the structure 100. FIG. 15 corresponds to FIG. 13, and FIG. 16 corresponds to FIG. 14. In step S21, the attachment apparatus attaches an adhesive film AF to the second substrate 120 side of the structure 100. The dicing tapes DT, the protection films PF, and the adhesive film AF may be resin films of the same material and thickness or films of different materials and thicknesses.

In step S22, the scribing apparatus cleaves the second substrate 120 from the grooves GRa and GRb by using dividing tools CT. The scribing apparatus may cleave the second substrate 120 in the first direction from the grooves GRa and then cleave the second substrate 120 in the second direction from the grooves GRb, or cleave the second substrate 120 in the second direction from the grooves GRb and then cleave the second substrate 120 in the first direction from the grooves GRa.

The formation of the plurality of grooves GRa and GRb with only a small variation in depth in the second substrate 120 enables the scribing apparatus to accurately cleave the second substrate 120 in the first and second directions. As a result, the second substrate 120 is divided into the counter substrates 121 that form the liquid crystal devices 130 and unnecessary portions NP being the portions other than the counter substrates 121.

Figure 17:
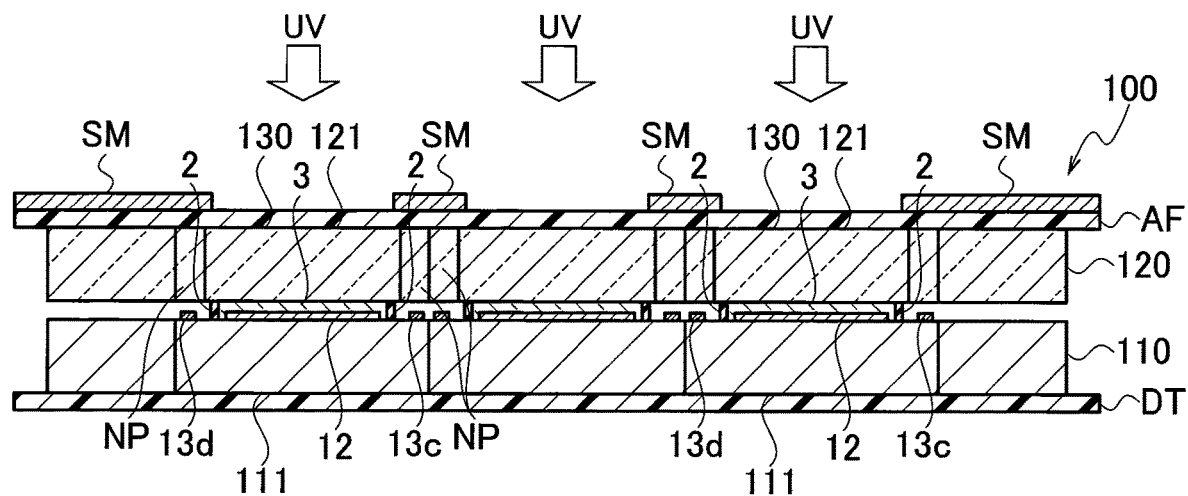
FIG. 17 is a cross-sectional view illustrating the structure in a step of the liquid crystal device manufacturing method in the first embodiment.
Figure 18:
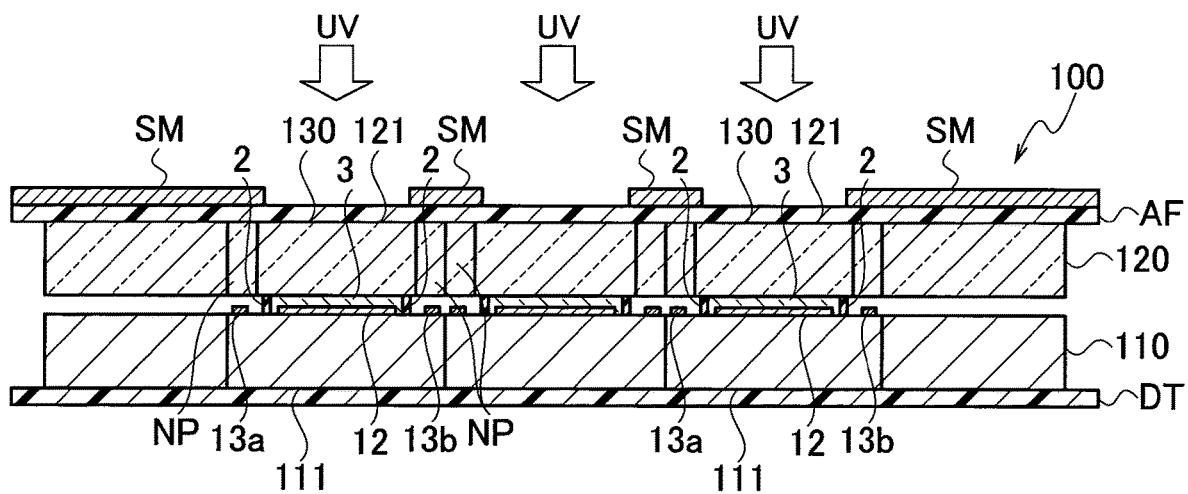
FIG. 18 is a cross-sectional view illustrating the structure in the step of the liquid crystal device manufacturing method in the first embodiment.

As illustrated in FIGS. 17 and 18, in step S23, a light source (e.g., ultraviolet application apparatus) applies light in a predetermined wavelength range (e.g., ultraviolet rays UV) to the adhesive film AF in a state where the regions corresponding to the unnecessary portions NP are shielded from light by a light shielding mask SM. FIG. 17 corresponds to FIG. 15, and FIG. 18 corresponds to FIG. 16. The adhesive strength of the regions in the adhesive film AF irradiated with the ultraviolet rays UV is now lowered.

Figure 19:
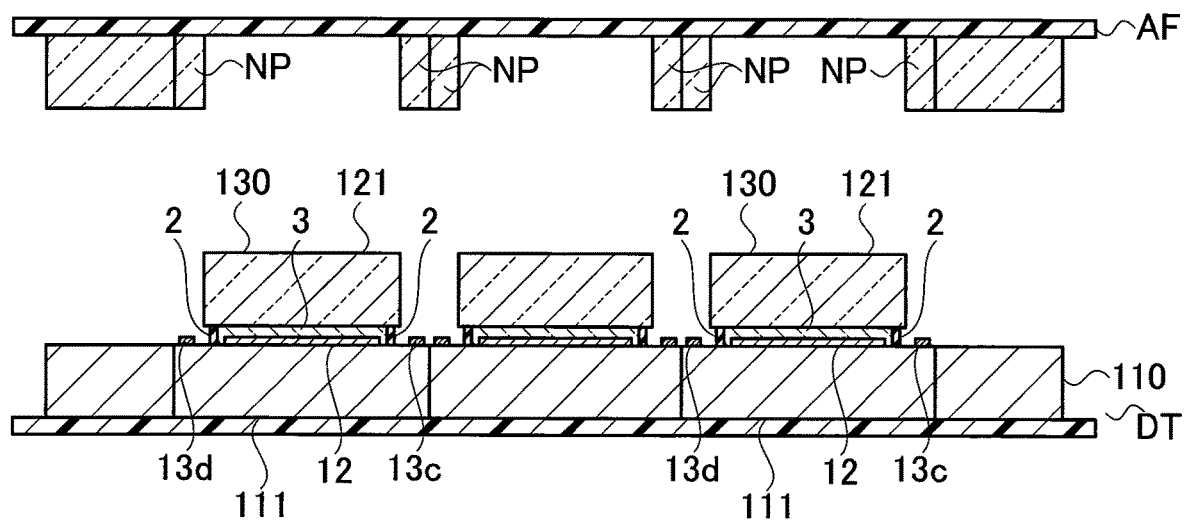
FIG. 19 is a cross-sectional view illustrating the structure in a step of the liquid crystal device manufacturing method in the first embodiment.
Figure 20:
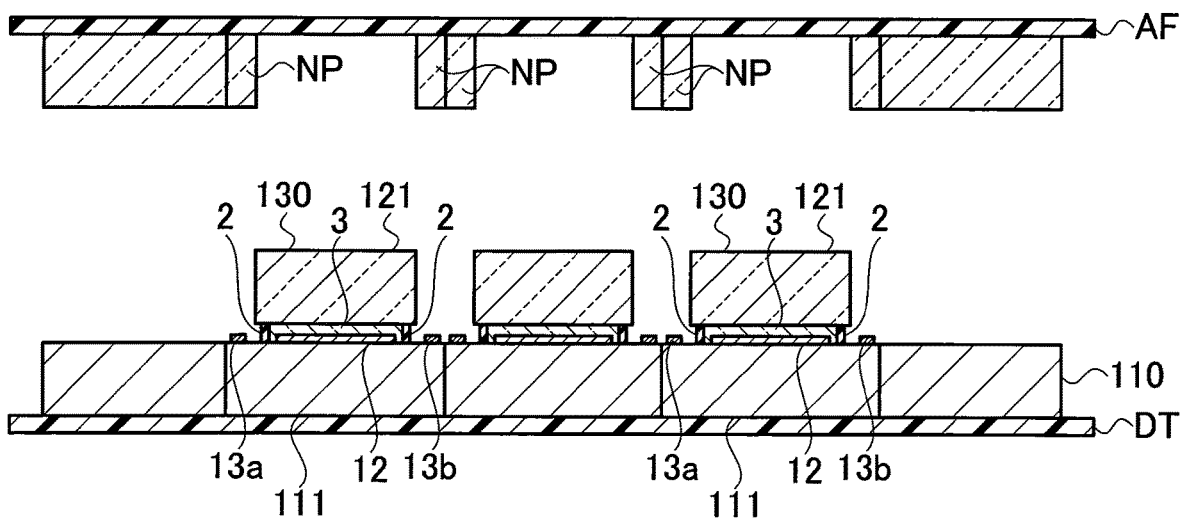
FIG. 20 is a cross-sectional view illustrating the structure in the step of the liquid crystal device manufacturing method in the first embodiment.

As illustrated in FIGS. 19 and 20, the operator removes the adhesive film AF from the structure 100. FIG. 19 corresponds to FIG. 17, and FIG. 20 corresponds to FIG. 18. Since the adhesive strength of the regions in the adhesive film AF corresponding to the liquid crystal devices 130 (counter substrates 121) is lowered, the operator can easily remove the adhesive film AF from the structure 100.

Since the regions in the adhesive film AF corresponding to the unnecessary portions NP have not been irradiated with the ultraviolet rays UV, the unnecessary portions NP are removed from the structure 100 along with the adhesive film AF in a state where the adhesive strength of the adhesive film AF on the unnecessary portions NP is maintained. Thus, when the unnecessary portions NP are detached in step S22 or when the adhesive film AF is removed from the structure 100 in step S23, the unnecessary portions NP are prevented from falling onto the drive substrates 111, on which the terminal portions 13a to 13d are formed, and damaging the drive substrates 111 or the terminal portions 13a to 13d.

By the above steps S11 to S23, a plurality of liquid crystal devices 130 are fabricated from a single structure 100. The operator may execute the process of at least one of steps S11 to S23 or part of the process of that step.

Figure 21:
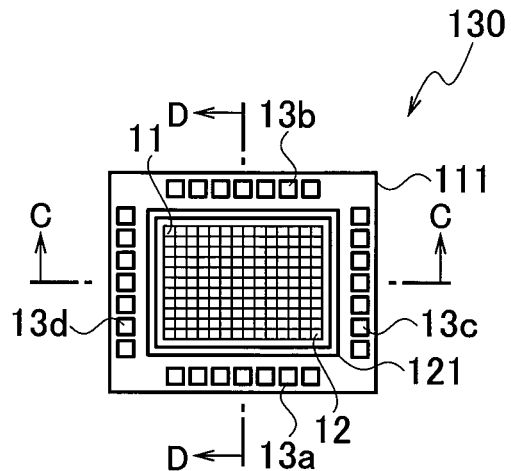
FIG. 21 is a plan view illustrating an example of a liquid crystal device in the first embodiment.
Figure 22:
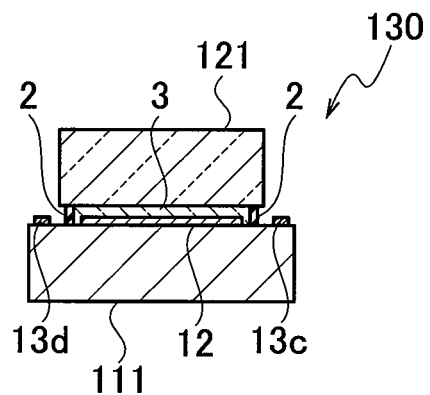
FIG. 22 is a cross-sectional view illustrating the liquid crystal device taken along line C-C in FIG. 21.
Figure 23:
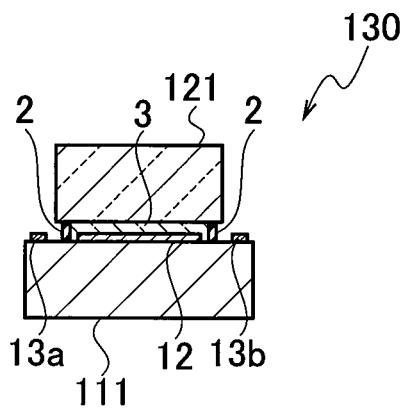
FIG. 23 is a cross-sectional view illustrating the liquid crystal device taken along line D-D in FIG. 21.

As illustrated in FIGS. 21 to 23, each liquid crystal device 130 includes a drive substrate 111 fabricated from the first substrate 110, a counter substrate 121 fabricated from the second substrate 120, a seal 2, and a liquid crystal 3. FIG. 21 illustrates the liquid crystal device 130 as viewed from the counter substrate 121. FIG. 22 schematically illustrates the liquid crystal device 130 taken along line C-C in FIG. 21. FIG. 23 schematically illustrates the liquid crystal device 130 taken along line D-D in FIG. 21.

The drive substrate 111 has a pixel region 12 in which a plurality of pixel electrodes 11 are formed, and a plurality of terminal portions 13a to 13d. The drive substrate 111 and the counter substrate 121 are bonded to each other by the seal 2 with a gap (cell gap) between the drive substrate 111 and the counter substrate 121. The liquid crystal 3 is filled in the gap the drive substrate 111 and the counter substrate 121 and sealed by the seal 2.

The end surfaces of the drive substrate 111 on the long-edge sides and the short-edge sides are cut surfaces cut by the dicing blade. The end surfaces of the counter substrate 121 on the long-edge sides and the short-edge sides include cleaved surfaces scribed by the scribing wheel and further cleaved by the dividing tools CT. In other words, the end surfaces of the counter substrate 121 on the terminal portions 13a to 13d side are each formed of a scribed surface and a cleaved surface.

In the liquid crystal device manufacturing method in the first embodiment, the adhesive film AF is attached to the second substrate 120 in step S21 after the formation of the grooves GRa and GRb. In other words, the adhesive film AF is in a condition of not being damaged by the scribing wheel in steps S15, S17, S18, and S20.

If the adhesive film AF were damaged by the scribing wheel in at least one of steps S15, S17, S18, and S20, it would be difficult to efficiently remove the adhesive film AF from the structure 100. Thus, with the liquid crystal device manufacturing method in the first embodiment, the adhesive film AF is easily removed from the structure 100.

Second Embodiment

An example of a liquid crystal device manufacturing method and a liquid crystal device in a second embodiment will be described with reference to the flowcharts illustrated in FIGS. 24A and 24B and FIGS. 25 to 46. To facilitate understanding of the description, the same constituent components as those in the first embodiment are designated by the same reference numerals.

Figure 24A:
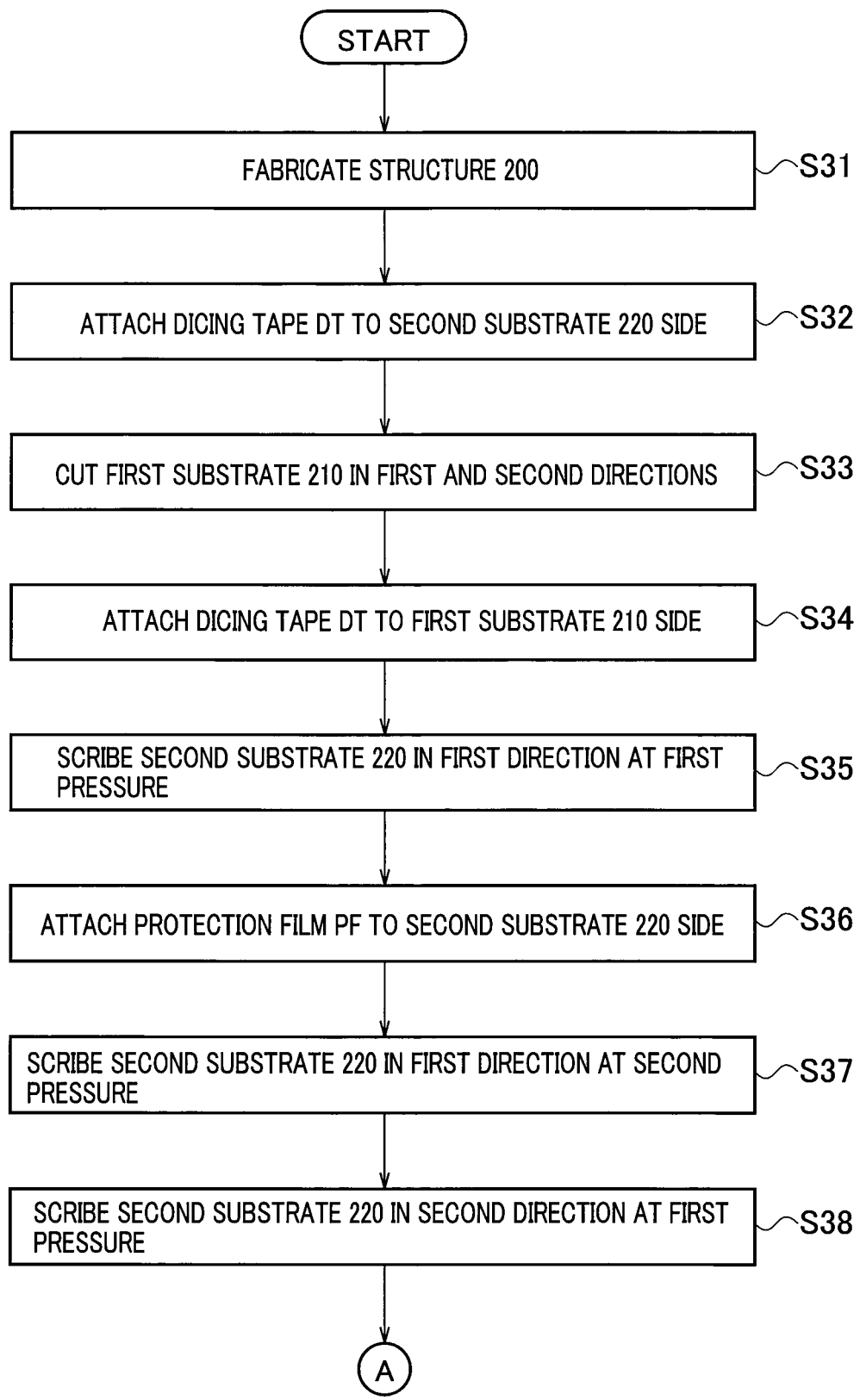
FIG. 24A is a flowchart illustrating an example of a liquid crystal device manufacturing method in a second embodiment.
Figure 25:
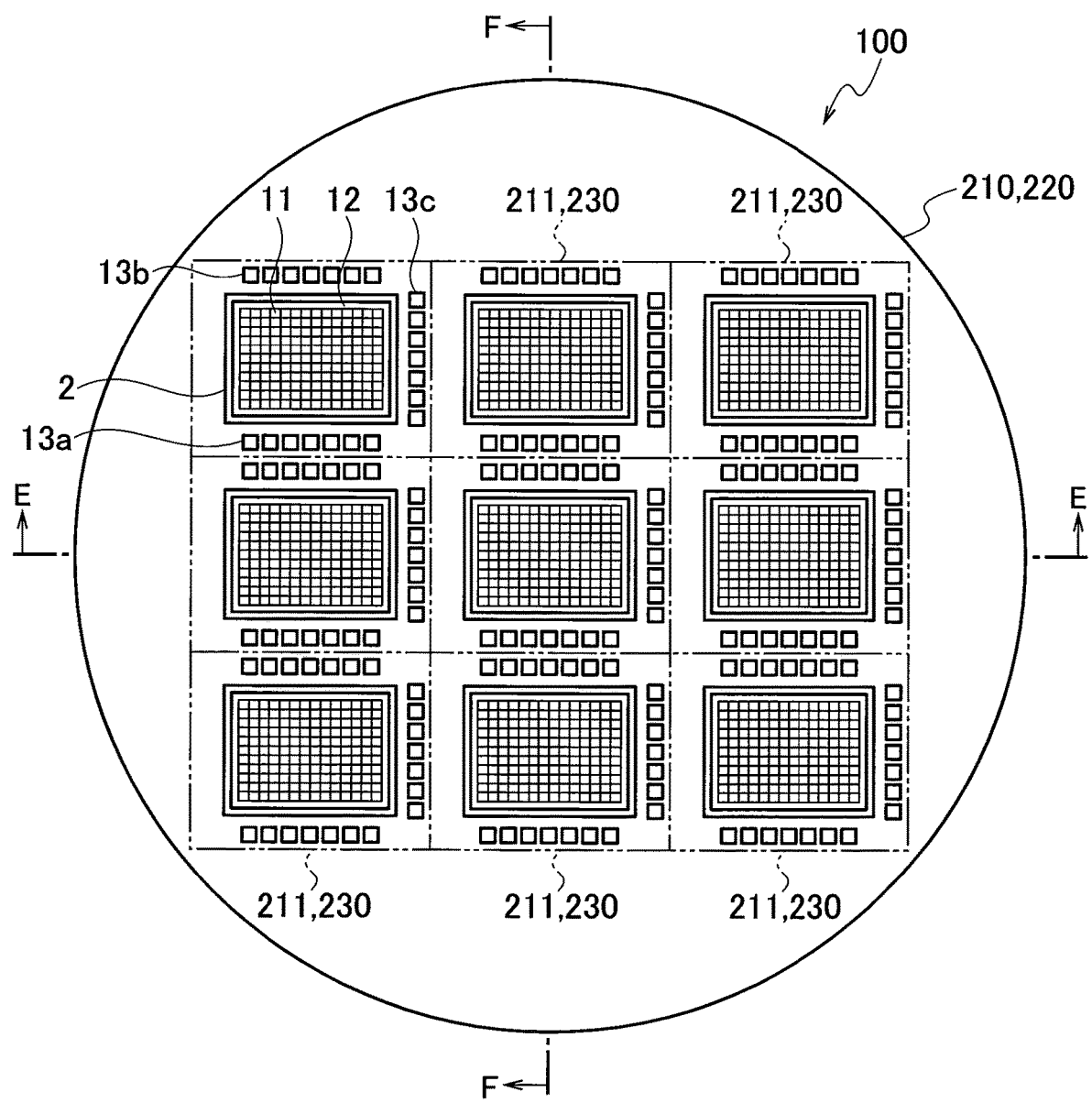
FIG. 25 is a plan view illustrating an example of a structure.
Figure 26:
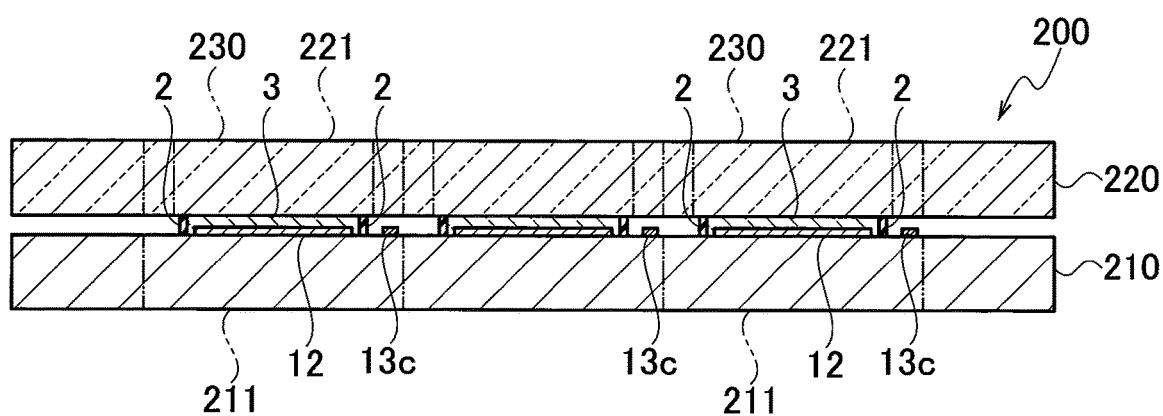
FIG. 26 is a cross-sectional view illustrating the structure taken along line E-E in FIG. 25.
Figure 27:
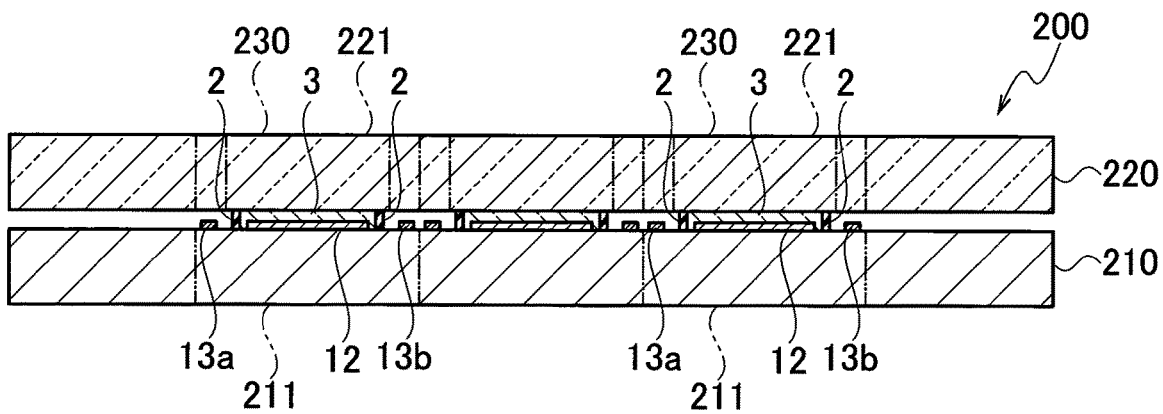
FIG. 27 is a cross-sectional view illustrating the structure taken along line F-F in FIG. 25.

Referring to FIG. 24A, a bonding apparatus fabricates a structure 200 in step S31. FIG. 25 illustrates a state where nine liquid crystal devices 230 are disposed in one structure 200. FIG. 26 schematically illustrates the structure 200 taken along line E-E in FIG. 25. FIG. 27 schematically illustrates the structure 200 taken along line F-F in FIG. 25. The number of liquid crystal devices 230 fabricated from a single structure 200 and their arrangement can be set at any number and arrangement.

As illustrated in FIGS. 25 to 27, the structure 200 has a construction in which a first substrate 210 that will be drive substrates 211 and a second substrate 220 that will be counter substrates 221 are bonded to each other by seals 2 with a gap between the first substrate 210 and the second substrate 220, and a liquid crystal 3 is filled in the gap between the first substrate 210 and the second substrate 220 and sealed by the seals 2. FIG. 25 schematically illustrates the structure 200 as viewed from the second substrate 220. The structure 200 can be fabricated by a publicly known manufacturing method. A semiconductor substrate may be used as the first substrate 210, and a glass substrate may be used as the second substrate 220.

The up-down direction and the left-right direction in FIG. 25 will be referred to as a first direction and a second direction, respectively. The first direction and the second direction are perpendicular to each other.

The drive substrates 211 and the counter substrates 221 have a rectangular planar shape. Each drive substrate 211 has a pixel region 12 in which a plurality of pixel electrodes 11 are formed, and a plurality of terminal portions 13a to 13c. On the first substrate 210, a plurality of sets each including a pixel region 12 and terminal portions 13a to 13c are disposed in a matrix. A single set including a pixel region 12 and terminal portions 13a to 13c forms a single liquid crystal device 230. In other words, a plurality of liquid crystal devices 230 are disposed in a matrix in the structure 200. The first direction corresponds to the short-edge direction of each liquid crystal device 230 (drive substrate 211 and counter substrate 221), and the second direction corresponds to the long-edge direction of the liquid crystal device 230 (drive substrate 211 and counter substrate 221).

The terminal portions 13a are formed on one of the long-edge sides of the drive substrate 211, and the terminal portions 13b are formed on the other long-edge side of the drive substrate 211. The terminal portions 13c are formed on one of the short-edge sides of the drive substrate 211. The liquid crystal device 230 in the second embodiment differs from the liquid crystal device 130 in the first embodiment in that the fourth terminal portions 13d are not formed on the drive substrate 211.

Figure 28:
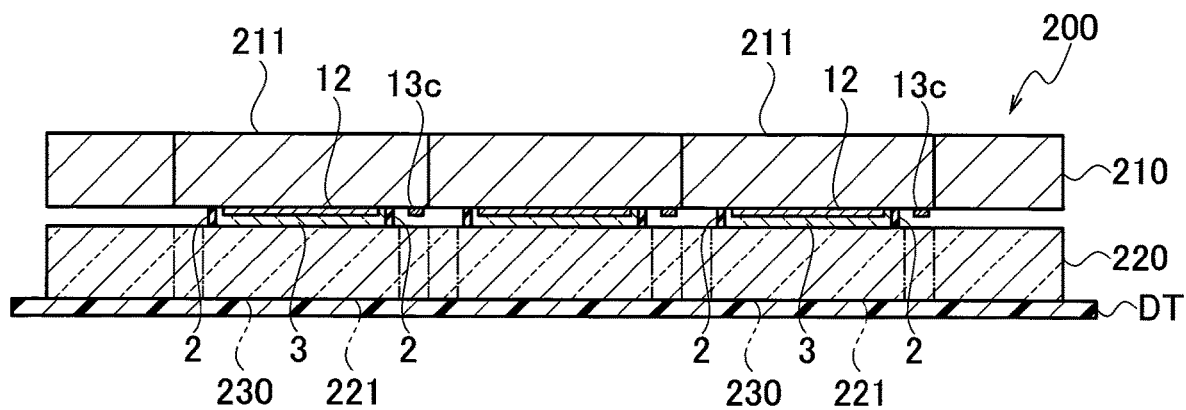
FIG. 28 is a cross-sectional view illustrating the structure in steps of the liquid crystal device manufacturing method in the second embodiment.
Figure 29:
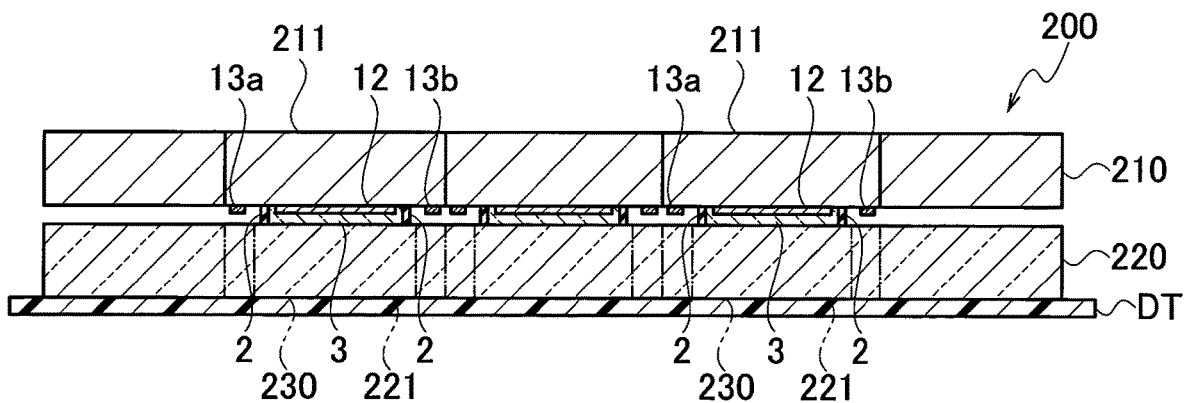
FIG. 29 is a cross-sectional view illustrating the structure in the steps of the liquid crystal device manufacturing method in the second embodiment.

As illustrated in FIGS. 28 and 29, in step S32, an attachment apparatus attaches dicing tape DT to the second substrate 220 side of the structure 200. FIG. 28 corresponds to FIG. 26 and illustrates the structure 200 turned upside down. FIG. 29 corresponds to FIG. 27 and illustrates the structure 200 turned upside down. In step S33, a dicing apparatus cuts the first substrate 210 with a dicing blade in the first and second directions at a pitch corresponding to that of the liquid crystal devices 230. As a result, the first substrate 210 is divided for each individual liquid crystal device 230, so that a plurality of drive substrates 211 are formed. The operator then removes the dicing tape DT from the structure 200.

Figure 30:
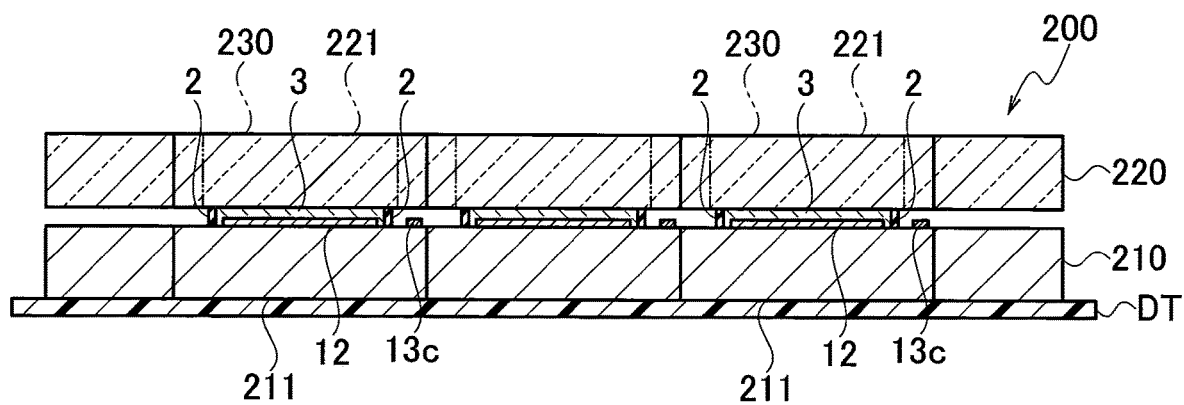
FIG. 30 is a cross-sectional view illustrating the structure in steps of the liquid crystal device manufacturing method in the second embodiment.
Figure 31:
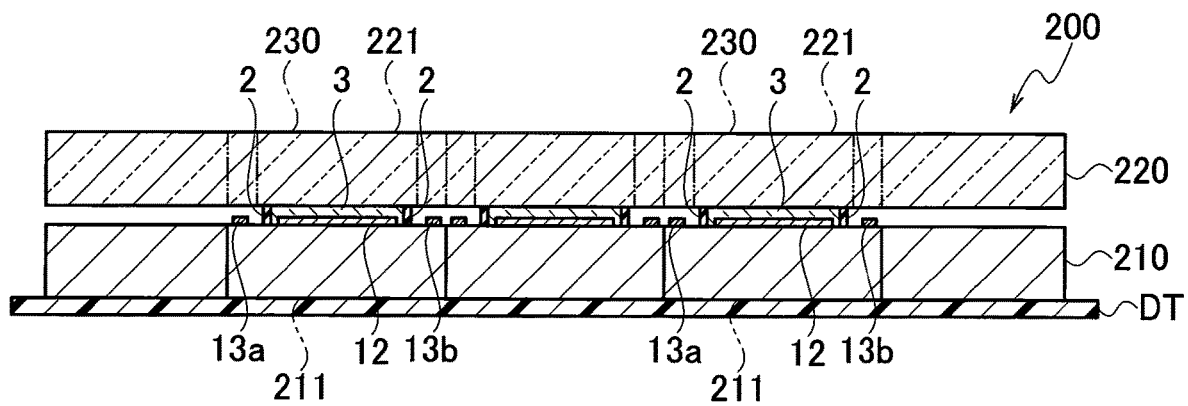
FIG. 31 is a cross-sectional view illustrating the structure in the steps of the liquid crystal device manufacturing method in the second embodiment.

As illustrated in FIGS. 30 and 31, in step S34, the attachment apparatus attaches dicing tape DT to the first substrate 210 side of the structure 200. FIG. 30 corresponds to FIG. 28 and illustrates the structure 200 turned upside down. FIG. 31 corresponds to FIG. 29 and illustrates the structure 200 turned upside down. In step S35, a scribing apparatus scribes the second substrate 220 with a scribing wheel in the first direction at a first pressure at a pitch corresponding to that of the liquid crystal devices 230. The first pressure is a relatively high pressure at which the second substrate 220 can be divided via scribing.

Figure 32:
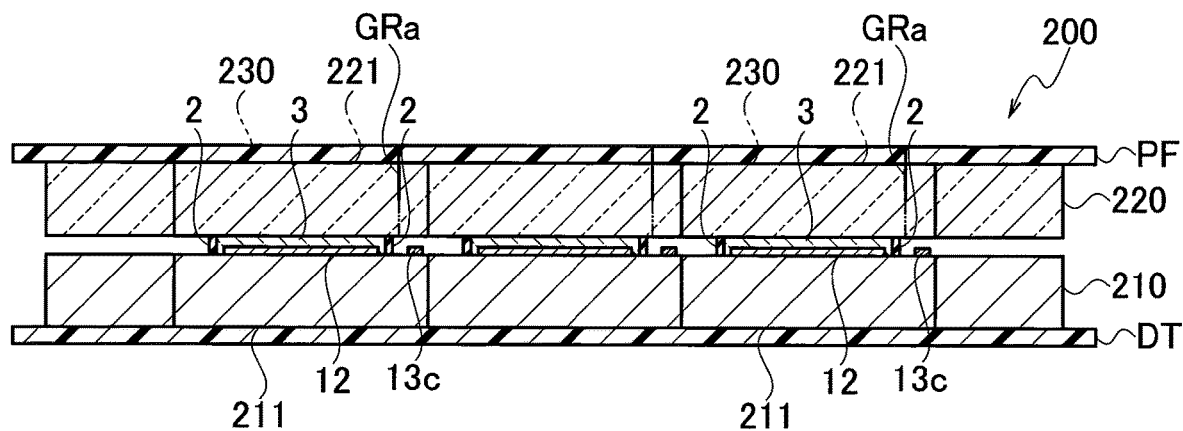
FIG. 32 is a cross-sectional view illustrating the structure in steps of the liquid crystal device manufacturing method in the second embodiment.
Figure 33:
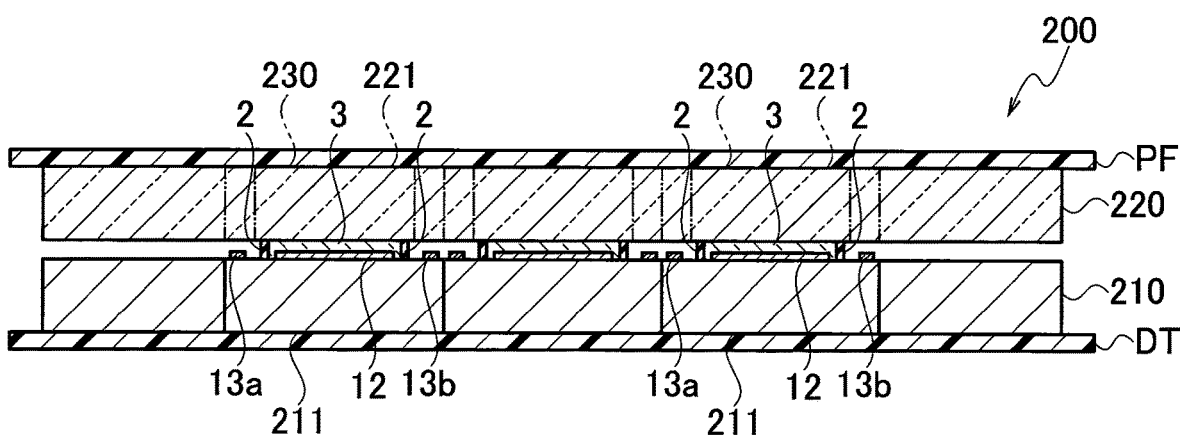
FIG. 33 is a cross-sectional view illustrating the structure in the steps of the liquid crystal device manufacturing method in the second embodiment.

As illustrated in FIGS. 32 and 33, in step S36, the attachment apparatus attaches an adhesive protection film PF to the second substrate 220 side of the structure 200. FIG. 32 corresponds to FIG. 30, and FIG. 33 corresponds to FIG. 31.

In step S37, the scribing apparatus moves the scribing wheel to a position corresponding to the short edge of a counter substrate 221 on its terminal portions 13c side, and scribes the second substrate 120 in the first direction at a second pressure. The second pressure is a relatively low pressure which is lower than the first pressure and at which the second substrate 220 can be scribed to such a depth as not to divide the second substrate 220 (e.g., a depth in the range of ½ to ⅓ of the thickness of the second substrate 220).

Generally, scribing the second substrate 220 at a low pressure results in a large variation in the depth of the groove formed in the second substrate 220. The large variation in the depth of the groove makes it difficult to accurately cleave and divide the second substrate 220 when the second substrate 220 is cleaved from the groove.

In step S37, the second substrate 220 is scribed through the protection film PR The protection film PF absorbs the variation in the pressure of the scribing wheel applied to the second substrate 220. An adhesive resin film may be used as the protection film PR The protection film PF only needs to be of a material and a thickness that can absorb the variation in the pressure of the scribing wheel applied to the second substrate 220.

Thus, by scribing the second substrate 220 through the protection film PF, the second substrate 220 can be scribed at the second pressure, which is higher than a third pressure of the scribing wheel that, without the protection film PF, would be applied to scribe the second substrate 220, with a reduction in the variation in the pressure of the scribing wheel applied to the second substrate 220. As a result, as illustrated in FIG. 32, a plurality of grooves GRa with only a small variation in depth are formed in the second substrate 220. The grooves GRa are formed at positions corresponding to the short edges of the counter substrates 221 on their terminal portions 13c side in the second substrate 220.

The scribing wheel digs into the protection film PF and scribes the second substrate 220. The protection film PF suppresses displacement of the scribing wheel and therefore makes the positional accuracy of the grooves GRa better than that in the case where the protection film PF is not attached to the second substrate 220.

Figure 34:
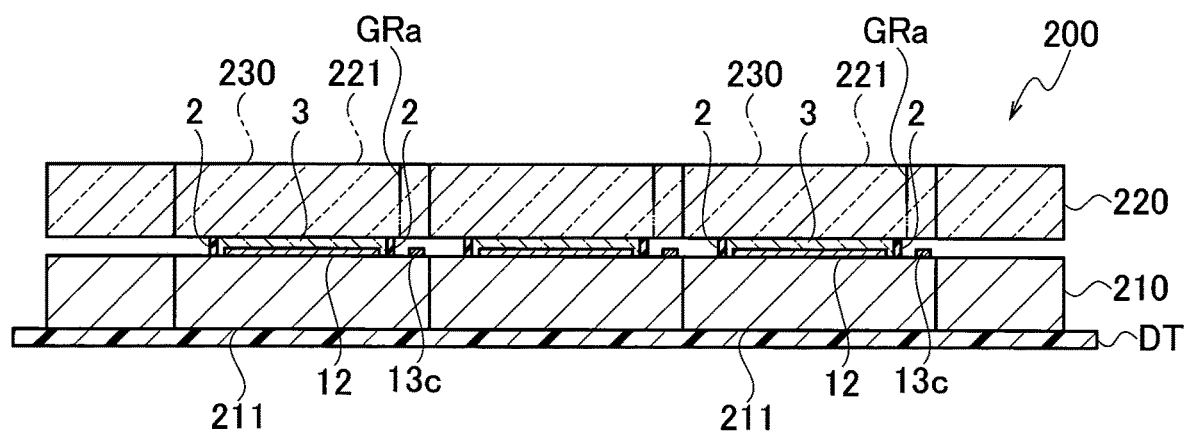
FIG. 34 is a cross-sectional view illustrating the structure in steps of the liquid crystal device manufacturing method in the second embodiment.
Figure 35:
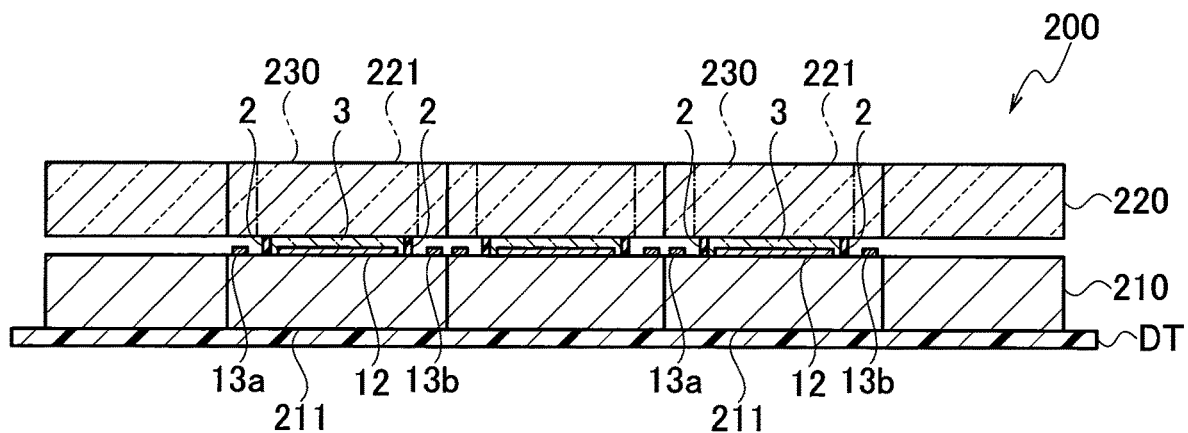
FIG. 35 is a cross-sectional view illustrating the structure in the steps of the liquid crystal device manufacturing method in the second embodiment.

As illustrated in FIGS. 34 and 35, the operator removes the protection film PF from the structure 200. FIG. 34 corresponds to FIG. 32, and FIG. 35 corresponds to FIG. 33. In step S38, the scribing apparatus scribes the second substrate 220 with the scribing wheel in the second direction at the first pressure at a pitch corresponding to that of the liquid crystal devices 230.

Figure 24B:
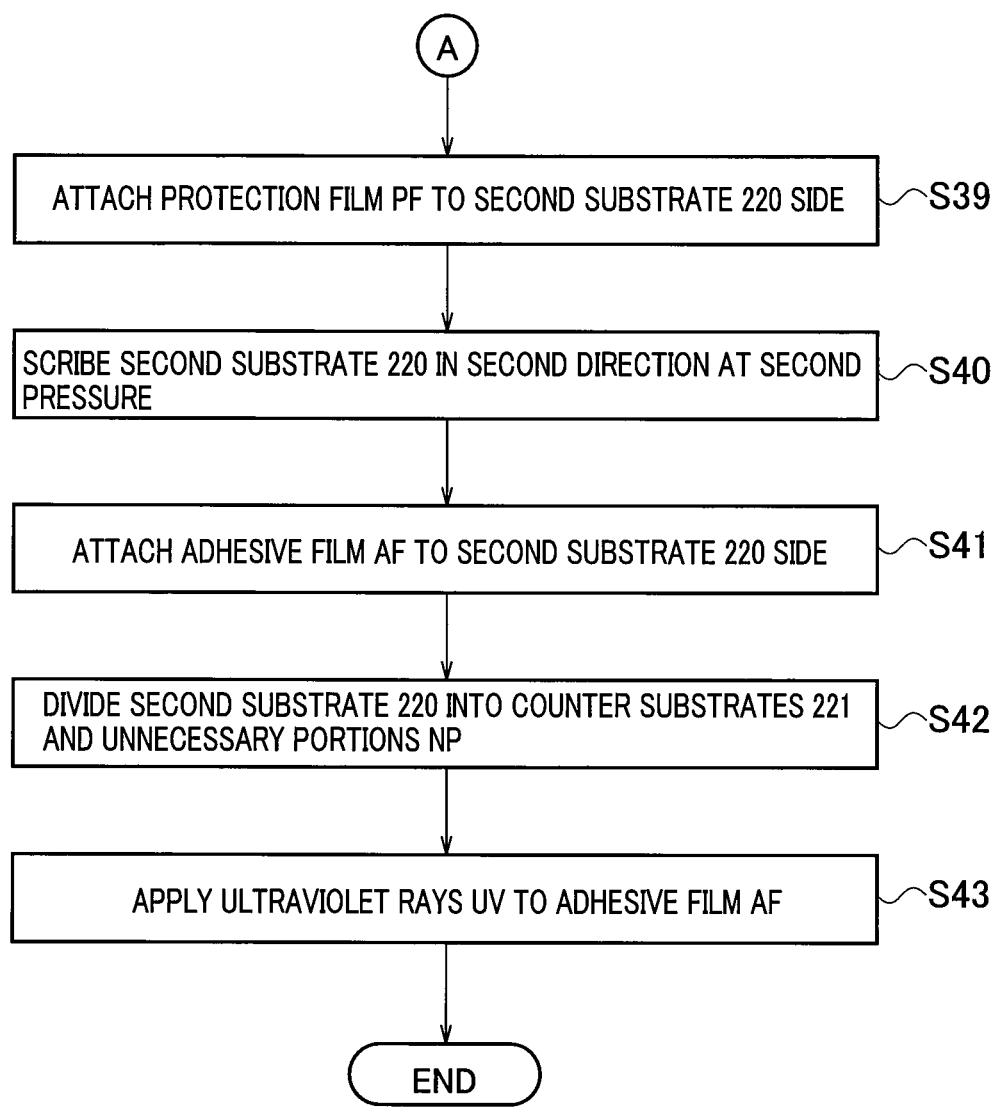
FIG. 24B is a flowchart illustrating the example of the liquid crystal device manufacturing method in the second embodiment.
Figure 36:
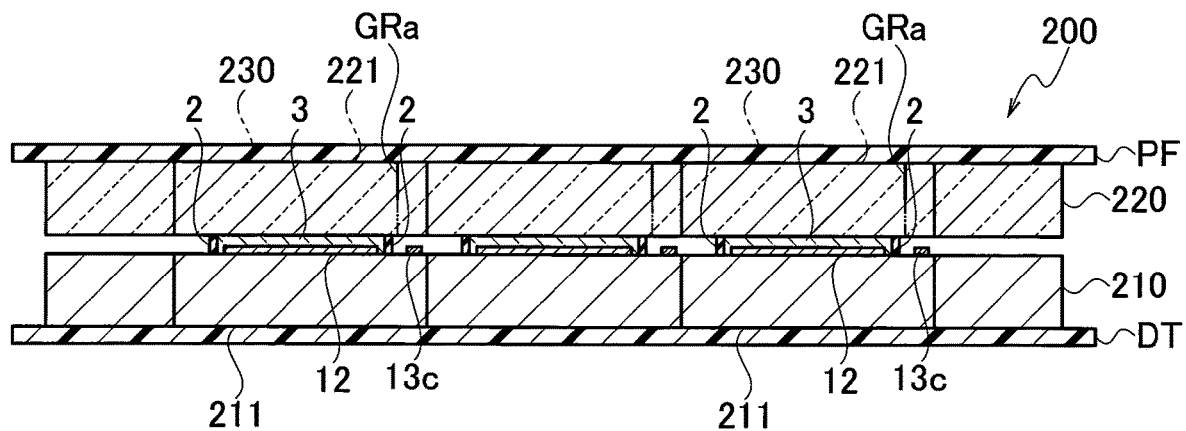
FIG. 36 is a cross-sectional view illustrating the structure in steps of the liquid crystal device manufacturing method in the second embodiment.
Figure 37:
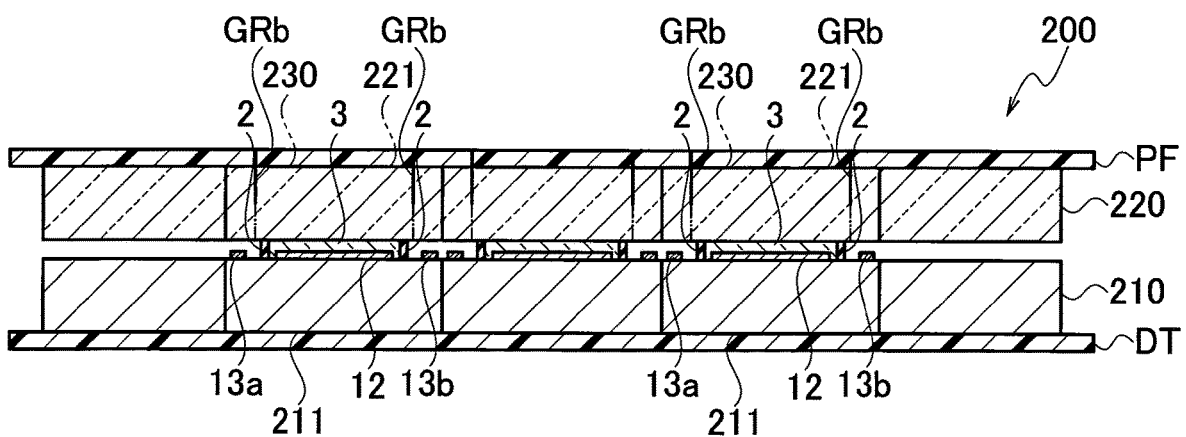
FIG. 37 is a cross-sectional view illustrating the structure in the steps of the liquid crystal device manufacturing method in the second embodiment.

Referring to FIG. 24B, in step S39, the attachment apparatus attaches a protection film PF to the second substrate 220 side of the structure 200, as illustrated in FIGS. 36 and 37. FIG. 36 corresponds to FIG. 34, and FIG. 37 corresponds to FIG. 35.

In step S40, the scribing apparatus moves the scribing wheel to a position corresponding to a long edge of a counter substrate 221, and scribes the second substrate 220 with the scribing wheel in the second direction at the second pressure. As a result, as illustrated in FIG. 37, a plurality of grooves GRb with only a small variation in depth are formed in the second substrate 220. The grooves GRb are formed at positions corresponding to the long edges of the counter substrates 221 in the second substrate 220.

The scribing wheel digs into the protection film PF and scribes the second substrate 220. The protection film PF suppresses displacement of the scribing wheel and therefore makes the positional accuracy of the grooves GRb better than that in the case where the protection film PF is not attached to the second substrate 220.

Figure 38:
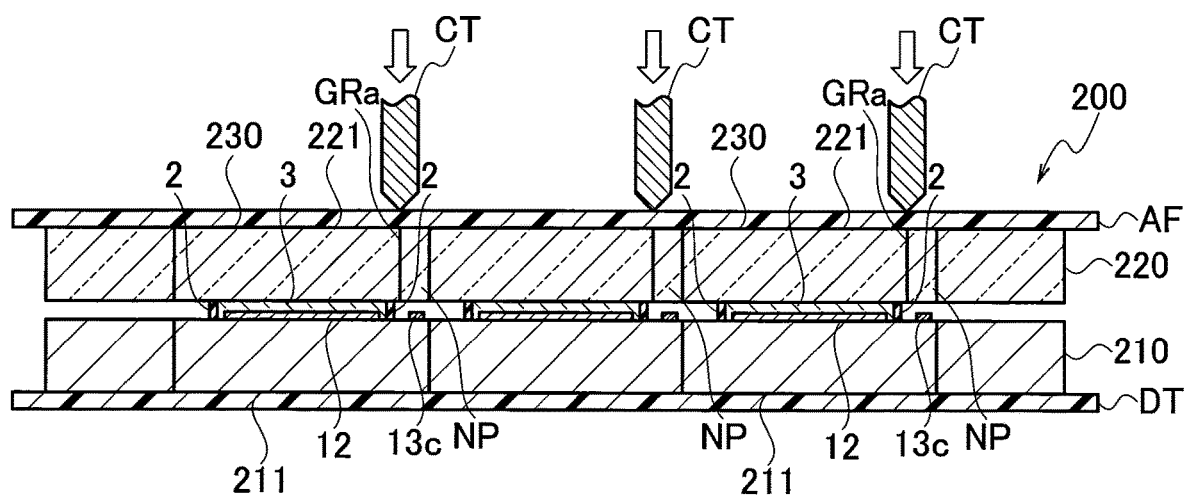
FIG. 38 is a cross-sectional view illustrating the structure in steps of the liquid crystal device manufacturing method in the second embodiment.
Figure 39:
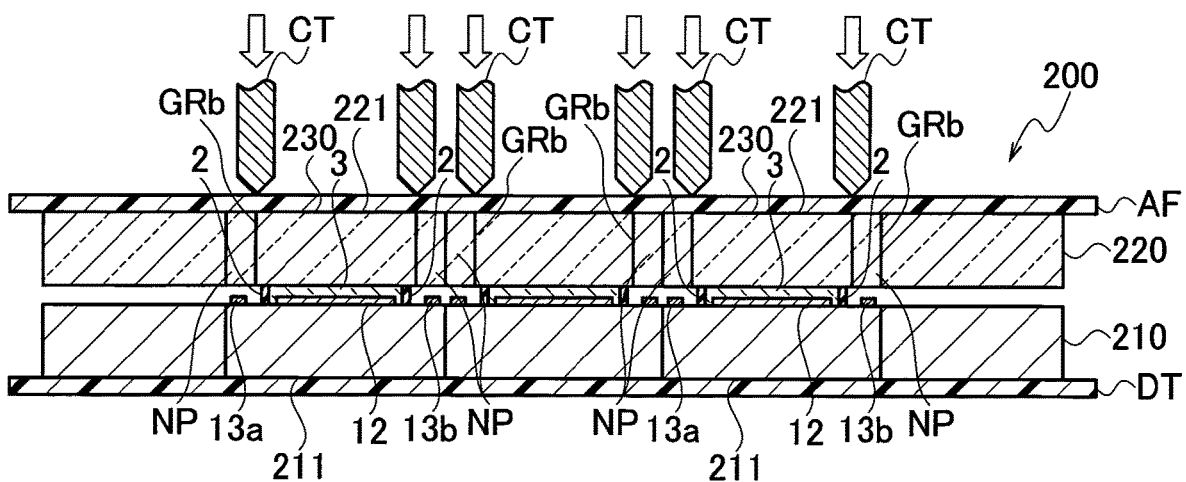
FIG. 39 is a cross-sectional view illustrating the structure in the steps of the liquid crystal device manufacturing method in the second embodiment.

As illustrated in FIGS. 38 and 39, the operator removes the protection film PF from the structure 200. FIG. 38 corresponds to FIG. 36, and FIG. 39 corresponds to FIG. 37. In step S41, the attachment apparatus attaches an adhesive film AF to the second substrate 220 side of the structure 200. The dicing tapes DT, the protection films PF, and the adhesive film AF may be resin films of the same material and thickness or films of different materials and thicknesses.

In step S42, the scribing apparatus cleaves the second substrate 220 from the grooves GRa and GRb by using dividing tools CT. The scribing apparatus may cleave the second substrate 220 in the first direction from the grooves GRa and then cleave the second substrate 220 in the second direction from the grooves GRb, or cleave the second substrate 220 in the second direction from the grooves GRb and then cleave the second substrate 220 in the first direction from the grooves GRa.

The formation of the plurality of grooves GRa and GRb with only a small variation in depth in the second substrate 220 enables the scribing apparatus to accurately cleave the second substrate 220 in the first and second directions. As a result, the second substrate 220 is divided into the counter substrates 221 that form the liquid crystal devices 230 and unnecessary portions NP being the portions other than the counter substrates 221.

Figure 40:
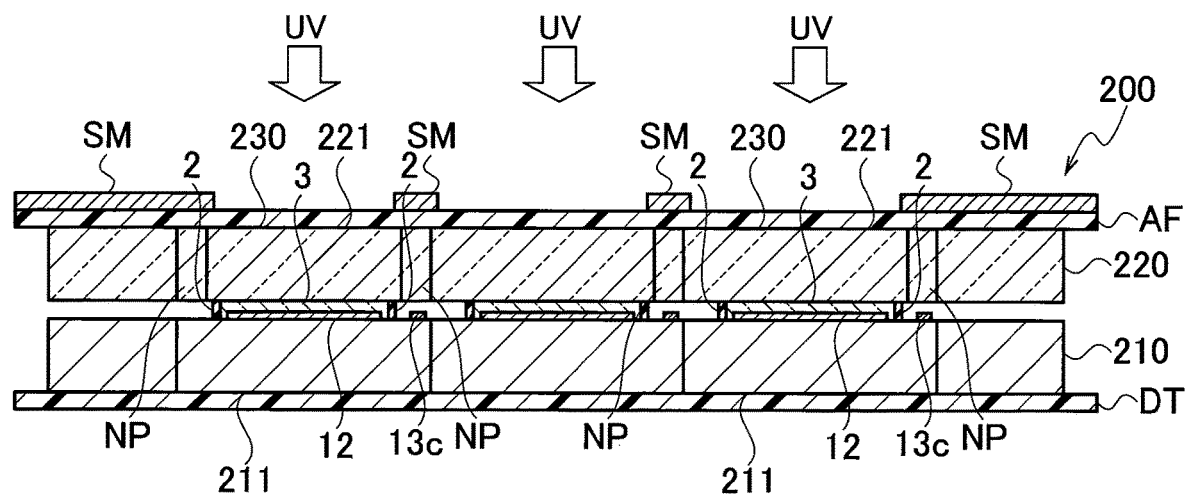
FIG. 40 is a cross-sectional view illustrating the structure in a step of the liquid crystal device manufacturing method in the second embodiment.
Figure 41:
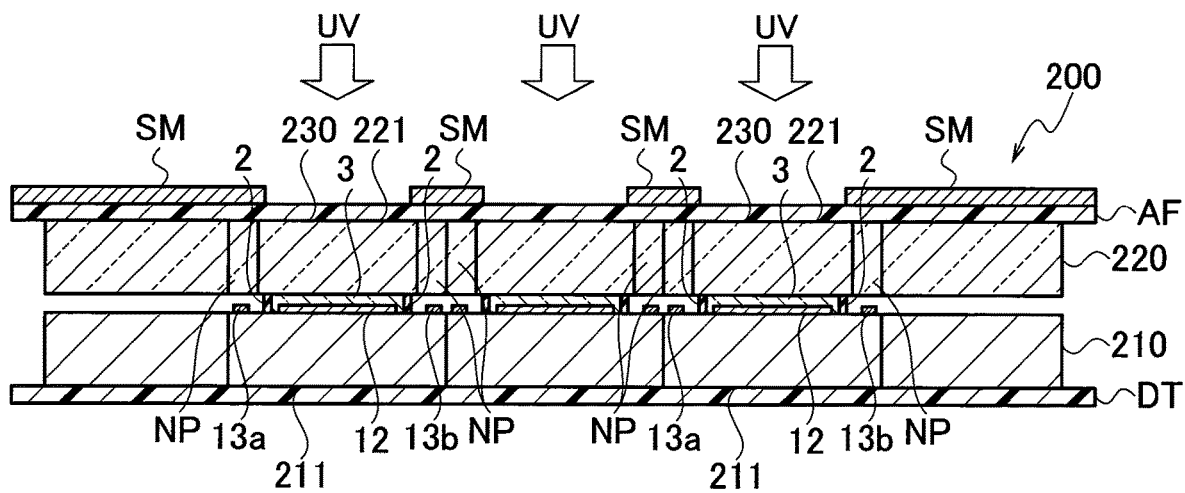
FIG. 41 is a cross-sectional view illustrating the structure in the step of the liquid crystal device manufacturing method in the second embodiment.

As illustrated in FIGS. 40 and 41, in step S43, a light source (e.g., ultraviolet application apparatus) applies light in a predetermined wavelength range (e.g., ultraviolet rays UV) to the adhesive film AF in a state where the regions corresponding to the unnecessary portions NP are shielded from light by a light shielding mask SM. FIG. 40 corresponds to FIG. 38, and FIG. 41 corresponds to FIG. 39. The adhesive strength of the regions in the adhesive film AF irradiated with the ultraviolet rays UV is now lowered.

Figure 42:
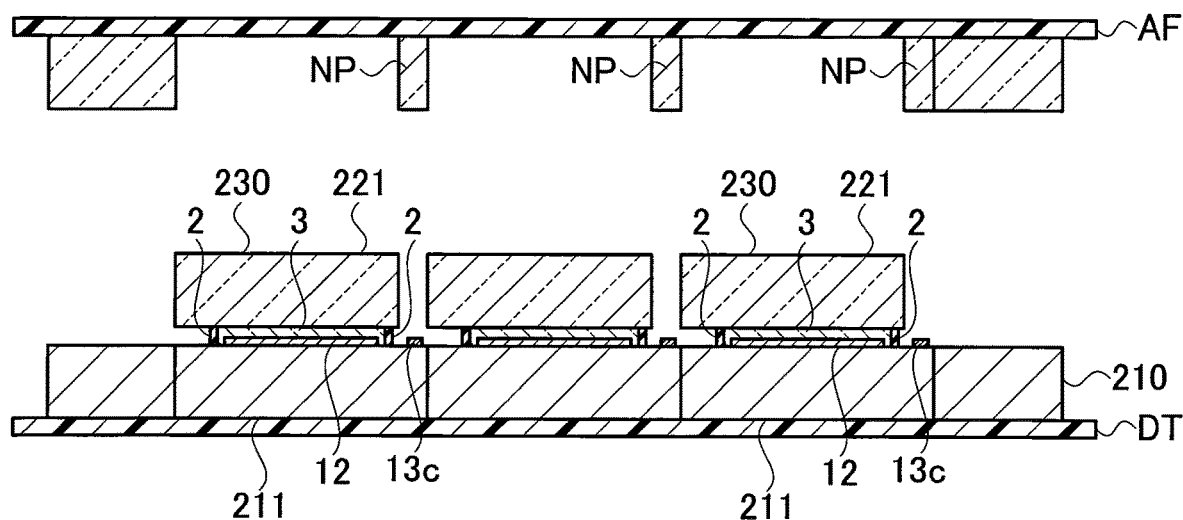
FIG. 42 is a cross-sectional view illustrating the structure in a step of the liquid crystal device manufacturing method in the second embodiment.
Figure 43:
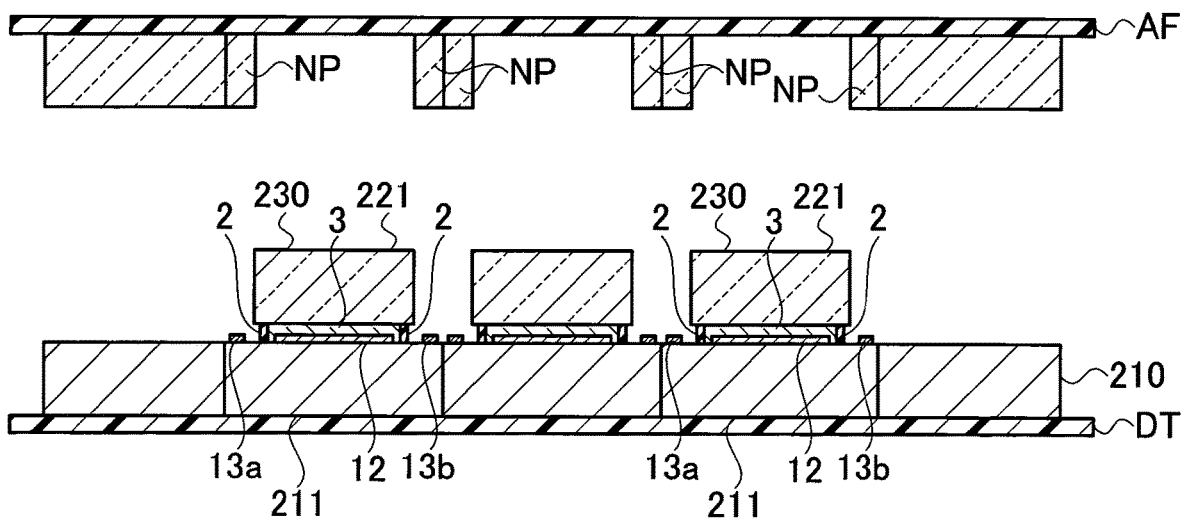
FIG. 43 is a cross-sectional view illustrating the structure in the step of the liquid crystal device manufacturing method in the second embodiment.

As illustrated in FIGS. 42 and 43, the operator removes the adhesive film AF from the structure 200. FIG. 42 corresponds to FIG. 40, and FIG. 43 corresponds to FIG. 41. Since the adhesive strength of the regions in the adhesive film AF corresponding to the liquid crystal devices 230 (counter substrates 221) is lowered, the operator can easily remove the adhesive film AF from the structure 200.

Since the regions in the adhesive film AF corresponding to the unnecessary portions NP have not been irradiated with the ultraviolet rays UV, the unnecessary portions NP are removed from the structure 200 along with the adhesive film AF in a state where the adhesive strength of the adhesive film AF on the unnecessary portions NP is maintained. Thus, when the unnecessary portions NP are detached in step S42 or when the adhesive film AF is removed from the structure 200 in step S43, the unnecessary portions NP are prevented from falling onto the drive substrates 211, on which the terminal portions 13a to 13c are formed, and damaging the drive substrates 211 or the terminal portions 13a to 13c.

By the above steps S31 to S43, a plurality of liquid crystal devices 230 are fabricated from a single structure 200. The operator may execute the process of at least one of steps S31 to S43 or part of the process of that step.

Figure 44:
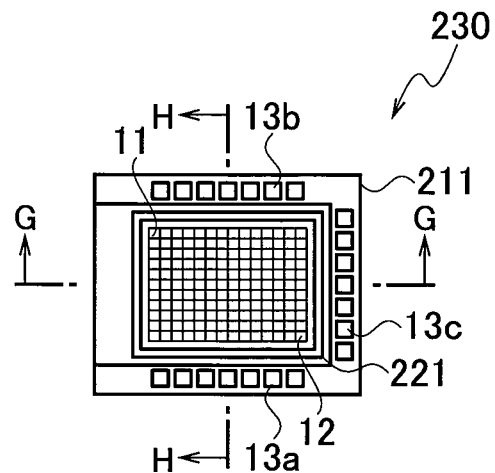
FIG. 44 is a plan view illustrating an example of a liquid crystal device in the second embodiment.
Figure 45:
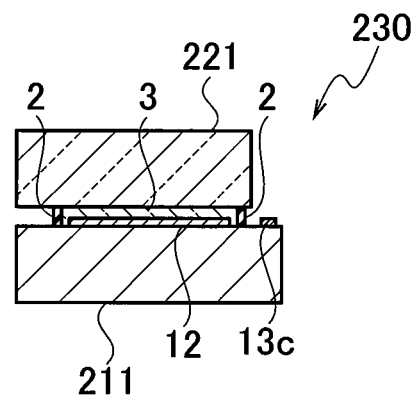
FIG. 45 is a cross-sectional view illustrating the liquid crystal device taken along line G-G in FIG. 44.
Figure 46:
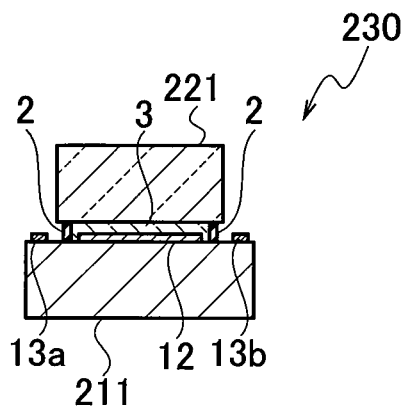
FIG. 46 is a cross-sectional view illustrating the liquid crystal device taken along line H-H in FIG. 44.

As illustrated in FIGS. 44 to 46, each liquid crystal device 230 includes a drive substrate 211 fabricated from the first substrate 210, a counter substrate 221 fabricated from the second substrate 220, a seal 2, and a liquid crystal 3. FIG. 44 illustrates the liquid crystal device 230 as viewed from the counter substrate 121. FIG. 45 schematically illustrates the liquid crystal device 230 taken along line G-G in FIG. 44. FIG. 46 schematically illustrates the liquid crystal device 230 taken along line H-H in FIG. 44.

The drive substrate 211 has a pixel region 12 in which a plurality of pixel electrodes 11 are formed, and a plurality of terminal portions 13a to 13c. The drive substrate 211 and the counter substrate 221 are bonded to each other by the seal 2 with a gap (cell gap) between the drive substrate 211 and the counter substrate 221. The liquid crystal 3 is filled in the gap the drive substrate 211 and the counter substrate 221 and sealed by the seal 2.

The end surfaces of the drive substrate 211 on the long-edge sides and the short-edge sides are cut surfaces cut by the dicing blade. The end surface of the counter substrate 221 on the short-edge side opposite from the terminal portions 13c is a scribed surface scribed by the scribing wheel. The end surface of the counter substrate 221 on the short-edge side with the terminal portions 13c and the end surfaces of the counter substrate 221 on the long-edge sides include cleaved surfaces scribed by the scribing wheel and further cleaved by the dividing tools CT. In other words, the end surfaces of the counter substrate 221 on the terminal portions 13a to 13c side are each formed of a scribed surface and a cleaved surface.

In the liquid crystal device manufacturing method in the second embodiment, the adhesive film AF is attached to the second substrate 220 in step S41 after the formation of the grooves GRa and GRb. In other words, the adhesive film AF is in a condition of not being damaged by the scribing wheel in steps S35, S37, S38, and S40.

If the adhesive film AF were damaged by the scribing wheel in at least one of steps S35, S37, S38, and S40, it would be difficult to efficiently remove the adhesive film AF from the structure 200. Thus, with the liquid crystal device manufacturing method in the second embodiment, the adhesive film AF is easily removed from the structure 200.

In the liquid crystal device manufacturing methods in the first and second embodiments, the second substrates 120 and 220 are scribed with a protection film PF attached to the second substrate 120 and 220 side of the structures 100 and 200. The protection film PF absorbs the variation in the pressure of the scribing wheel applied to the second substrates 120 and 120 and therefore enables formation of a plurality of grooves GR with only a small variation in depth in the second substrates 120 and 220. In the liquid crystal device manufacturing methods in the first and second embodiments, the second substrates 120 and 220 are cleaved from these grooves GR, the second substrates 120 and 220 are cleaved accurately.

If the grooves GRa and GRb are continuously formed using a single protection film PF, the protection film PF is divided by the scribing wheel in a grid pattern in the first and second directions for the individual liquid crystal devices 130. This makes it difficult to easily take off the protection film PF from the structure 100.

The scribing apparatus scribes a target object while running or spraying pure water over the target object. Thus, when the scribing apparatus scribes the structure 100 or 200 continuously in the first and second directions, the unnecessary portions NP detached from the second substrate 120 or 220 get separated from the structure 100 or 200 by the run or sprayed pure water. The separated unnecessary portions NP may damage the liquid crystal device 130 or 230.

In the liquid crystal device manufacturing methods in the first and second embodiments, a protection film PF is attached to the second substrates 120 and 220 in steps S16 and S36, the grooves GRa are formed in steps S17 and S37, and then the protection film PF is taken off. Further, a protection film PF is attached to the second substrates 120 and 220 in steps S19 and S39, the grooves GRb are formed in steps S20 and S40, and then the protection film PF is taken off. In this way, neither of the protection films PF is divided in a grid pattern, which makes it easier to take off the protection films PF from the structures 100 and 200.

In the liquid crystal device manufacturing methods in the first and second embodiments, the unnecessary portions NP are detached from the second substrates 120 and 220 while being adhesively attached to the adhesive film AF. This prevents the separated unnecessary portions NP from damaging the liquid crystal devices 130 and 230.

Note that the present invention is not limited to the above-described embodiments, but various changes can be made without departing from the gist of the present invention.

What is claimed is:

1. A liquid crystal device manufacturing method comprising:
   fabricating a structure in which a first substrate having a terminal portion and a second substrate are bonded to each other by a seal with a gap between the first substrate and the second substrate, and a liquid crystal is filled in the gap and sealed by the seal;
   forming a drive substrate having the terminal portion by dividing the first substrate;
   attaching a protection film to the second substrate side of the structure;
   forming a groove in the second substrate near the terminal portion through the protection film;
   forming a counter substrate by cleaving the second substrate from the groove, an end surface of the counter substrate on the terminal portion side including a cleaved surface; and
   fabricating a liquid crystal device in which the drive substrate and the counter substrate are bonded to each other by the seal with the gap between the drive substrate and the counter substrate, and the liquid crystal is filled in the gap and sealed by the seal.

2. The liquid crystal device manufacturing method according to claim 1, wherein the groove is formed by scribing the second substrate through the protection film with a scribing wheel.

3. The liquid crystal device manufacturing method according to claim 1, wherein
   the second substrate is cleaved from the groove to thereby be divided into the counter substrate and a portion other than the counter substrate, and
   the liquid crystal device manufacturing method further comprises:
   lowering adhesive strength of the protection film at a region corresponding to the counter substrate by applying light in a predetermined wavelength range to the protection film in a state where the portion other than the counter substrate is shielded from light; and removing the protection film from the structure along with the portion other than the counter substrate in a state where adhesive strength of the protection film at a region corresponding to the portion other than the counter substrate is maintained.

* * * * *